US008848787B2

(12) United States Patent
Karczewicz et al.

(10) Patent No.: US 8,848,787 B2
(45) Date of Patent: Sep. 30, 2014

(54) ENHANCEMENT LAYER CODING FOR SCALABLE VIDEO CODING

(75) Inventors: Marta Karczewicz, San Diego, CA (US); Rahul P. Panchal, San Diego, CA (US); Yan Ye, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1206 days.

(21) Appl. No.: 12/250,784

(22) Filed: Oct. 14, 2008

(65) Prior Publication Data
US 2009/0097548 A1 Apr. 16, 2009

Related U.S. Application Data

(60) Provisional application No. 60/979,919, filed on Oct. 15, 2007, provisional application No. 60/940,214, filed on Oct. 16, 2007.

(51) Int. Cl.
*H04N 7/12* (2006.01)
*H04N 11/02* (2006.01)
*H04N 11/04* (2006.01)
*H04N 19/93* (2014.01)
*H04N 19/61* (2014.01)
*H04N 19/33* (2014.01)

(52) U.S. Cl.
CPC ... *H04N 19/00436* (2013.01); *H04N 19/00957* (2013.01); *H04N 19/00781* (2013.01)
USPC ............ 375/240.03; 375/240.02; 375/240.08; 375/240.23; 375/240.24

(58) Field of Classification Search
USPC ............. 375/240.02, 240.03, 240.08, 240.23, 375/240.24
See application file for complete search history.

(56) References Cited

U.S. PATENT DOCUMENTS

| 4,302,775 | A | * | 11/1981 | Widergren et al. | ...... | 375/240.06 |
| 6,275,531 | B1 | * | 8/2001 | Li | ............... | 375/240.12 |
| 6,421,738 | B1 | * | 7/2002 | Ratan et al. | .................. | 719/328 |
| 7,348,903 | B2 | | 3/2008 | Lee et al. | | |

(Continued)

FOREIGN PATENT DOCUMENTS

| JP | 2003204550 A | 7/2003 |
| JP | 2004186811 A | 7/2004 |

(Continued)

OTHER PUBLICATIONS

Li, W., "Overview of Fine Granularity Scalability in MPEG-4 Video Standard," IEEE Transactions on Circuits and Systems for Video Technology, Mar. 2001.*

(Continued)

*Primary Examiner* — Luu Pham
*Assistant Examiner* — Kari Schmidt
(74) *Attorney, Agent, or Firm* — Brent A. Boyd

(57) ABSTRACT

This disclosure describes scalable video coding techniques. In particular, the techniques may be used to encode refinements of a video block for enhancement layer bit streams in a single coding pass, thereby reducing coding complexity, coding delay and memory requirements. In some instances, the techniques encode each nonzero coefficient of a coefficient vector of the enhancement layer without knowledge of any subsequent coefficients. Coding the enhancement layer in a single pass may eliminate the need to perform a first pass to analyze the coefficient vector and a second pass for coding the coefficient vector based on the analysis.

66 Claims, 13 Drawing Sheets

(56) References Cited

U.S. PATENT DOCUMENTS

| | | | |
|---|---|---|---|
| 7,586,425 B2* | 9/2009 | Ridge et al. .................. 341/67 |
| 2003/0151529 A1 | 8/2003 | Karczewicz | |
| 2006/0153294 A1* | 7/2006 | Wang et al. ............. 375/240.08 |
| 2006/0171463 A1* | 8/2006 | Hanamura et al. ....... 375/240.13 |
| 2007/0053425 A1* | 3/2007 | Ridge et al. ................... 375/240 |
| 2007/0053426 A1 | 3/2007 | Lee et al. | |
| 2007/0071088 A1* | 3/2007 | Lee et al. ................... 375/240.1 |
| 2007/0211950 A1 | 9/2007 | Shima | |
| 2007/0223825 A1 | 9/2007 | Ye et al. | |
| 2007/0230811 A1 | 10/2007 | Lee | |

FOREIGN PATENT DOCUMENTS

| | | | |
|---|---|---|---|
| JP | 2005020384 | A | 1/2005 |
| JP | 2005510908 | A | 4/2005 |
| KR | 20070027422 | A | 3/2007 |
| KR | 20070034918 | | 3/2007 |
| KR | 100714706 | B1 | 5/2007 |
| RU | 2004125588 | | 1/2006 |
| WO | 03045067 | A1 | 5/2003 |
| WO | WO03063501 | A1 | 7/2003 |

OTHER PUBLICATIONS

Meng-Wei Shen et al. "A memory efficient Fine Grain Scalability coefficient encoding method for H.264/AVC Scalable Video Extension." Circuits and Systems, 2009. ISCAS 2009. IEEE International Symposium on , vol., No., pp. 3034-3037, May 24-27, 2009.*

Wilson, D.; Ghanbari, M., "Optimisation of two-layer SNR scalability for MPEG-2 video," Acoustics, Speech, and Signal Processing, 1997. ICASSP-97., 1997 IEEE International Conference on , vol. 4, No., pp. 2637,2640 vol. 4, Apr. 21-24, 1997.*

Y. Bao, M. Karczewicz, X. Wang, J. Ridge, Y. Ye, W. J. Han, S. Y. Kim, JVT-W119, CE1: FGS Simplifications, 23rd JVT Meeting. San Jose, CA, USA. Apr. 21-27, 2007.

Choupani, et al., "Scalable Video Coding: A Technical Report," CE Technical Report, Sep. 2007, pp. 1-33, XP002516229.

Karczwewicz, et al., "FGS Simplifications," Joint Video Team (JVT) of ISO/IEC MPEG & ITU-T SG16 Q.6); 25th Meeting: Shenzhen, CN, Oct. 21-26, 2007, JVT-Y075, XP030007279.

Ridge, et al., "CE8: Variable length codes for SVC," Video Standards and Drafts, XX, XX, No. JVT-Q040, 17th Meeting: Nice, FR, Oct. 12, 2005, XP030006203.

Ridge, et al., "Improvement of FGS refinement pass," Video Standards and Drafts, XX, XX, No. JVT-V077, Jan. 14, 2007, XP030006885.

Ye, et al, "Adaptive Variable Length Coding for FGS," Joint Video Team (JVT) of ISO/IEC MPEG · ITU-T VCEG (ISO/IEC JTC1/SC29/WG11 and ITU-T SG16 Q.6); 20th Meeting: Klagenfurt, Austria, Jul. 15-21, 2006, JVT-T086, XP030006573.

International Search Report—PCT/US08/080034, International Searching Authority—European Patent Office, Mar. 4, 2009.

Written Opinion—PCT/US08/080034, International Searching Authority—European Patent Office, Mar. 4, 2009.

H.264/MPEG-4 AVC: "Encoding the video block at the first quality using a context adaptive variable length coding (CAVLC) process in accordance with the ITU-T H.264/MPEG-4, Part 10, Advanced Video Coding (AVC) standard" http:/en.wikipedia.org/wiki/MPEG-4_Part_10.

Karczewicz M. et al, "Improved Refinement Coefficient Coding", Joint Video Team (JVT) of ISO/IEC MPEG & ITU-T VCEG, JVT-U132, 21st Meeting, Hangzhou, Oct. 20-27, 2006.

Karczewicz M., "Report of core experiment on improved refinement coefficients coding (CE1)", JVT-V095, Joint Video Team (JVT) of ISO/IEC MPEG & ITU-T VCEG, 22nd Meeting: Marrakech, Jan. 13-19, 2007, p. 1 para.3-p. 2 para.7.

Taiwan Search Report—TW097139596—TIPO—Apr. 13, 2012.

Yey. et al, Improvements to FGS layer Variable Length Coder, JVT-5066, Joint Video Team (JVT) of ISO/IEC MPEG & ITU-T VCEG, 19th Meeting, Geneva, Mar. 31-Apr. 7, 2006.

* cited by examiner

ENHANCEMENT LAYER CODING FOR SCALABLE VIDEO CODING

This application claims the benefit of U.S. Provisional Application No. 60/979,919, filed Oct. 15, 2007 and U.S. Provisional Application No. 60/940,214, filed Oct. 16, 2007. The content of each of these applications is incorporated herein by reference.

TECHNICAL FIELD

This disclosure relates to digital video coding and, more particularly, to scalable video coding of video data.

BACKGROUND

Digital video capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as Motion Pictures Expert Group (MPEG)-2, MPEG-4, or International Telecommunication Union Standardization Sector (ITU-T) H.264/MPEG-4, Part 10, Advanced Video Coding (AVC) (hereinafter "H.264/MPEG-4 Part 10 AV" standard), to transmit and receive digital video more efficiently. Video compression techniques perform spatial and temporal prediction to reduce or remove redundancy inherent in video sequences.

In video coding, video compression typically includes spatial prediction and/or motion estimation and motion compensation to generate a prediction video block. Intra-coding relies on spatial prediction to reduce or remove spatial redundancy among video blocks within a given coding unit, e.g., frame or slice. In other words, a video encoder performs spatial prediction to compress data based on other data within the same coding unit. In contrast, inter-coding relies on temporal prediction to reduce or remove temporal redundancy among video blocks of successive video frames of a video sequence. Thus, for inter-coding, the video encoder performs motion estimation and motion compensation to track the movement of matching video blocks of two or more adjacent coding units.

After spatial or temporal prediction, a block of residual coefficients (referred to as a residual block or residual information) is generated by subtracting the prediction video block from the original video block that is being coded. The residual block may be a two-dimensional matrix of coefficient values that quantify the differences between the prediction video block and the original block. The video encoder may apply transform, quantization and entropy coding processes to the residual block to further reduce the bit rate associated with communication of the residual block. The transform techniques may comprise discrete cosine transforms (DCTs), wavelet transforms, integer transforms, or other types of transforms.

In a DCT transform, for example, the transform process converts a set of pixel-domain coefficients into transform coefficients that represent the energy of the pixel-domain coefficients in the frequency, or transform, domain. Quantization is applied to the transform coefficients to generate quantized transform coefficients. Quantization generally limits the number of bits associated with any given coefficient. The video encoder entropy encodes the quantized transform coefficients to further compress the quantized transform coefficients. The video encoder may entropy encode the coefficients using variable length coding (VLC), arithmetic coding, fixed length coding or a combination thereof. A video decoder may perform inverse operations to reconstruct the video sequence.

Some video coding standards, such as MPEG-2, encode video at a relatively constant quality, bit rate or spatial resolution. Such a technique may be sufficient to provide video applications to devices having similar decoder capabilities (e.g., memory or processing resources) and/or connection qualities. However, more modern video transmission systems typically include devices with varying decoder capabilities and/or connection qualities. In such systems, transmitting video encoded at a relatively constant quality, bit rate or spatial resolution results in the video applications working for devices that have appropriate decoder capabilities and/or connection qualities and not working for devices that do not have appropriate decoder capabilities and/or connection qualities. In the wireless context, for example, devices located closer to a source of the video transmission may have a higher quality connection than devices located farther from the source. As such, the devices located farther from the source may not be able to receive the encoded video transmitted at the constant quality, bit rate or spatial resolution.

Other video coding standards make use of scalable coding techniques to overcome these issues. Scalable video coding (SVC), e.g., in accordance with an extension of ITU-T H.264/MPEG-4, Part 10, AVC, refers to video coding in which the video sequence is encoded as a base layer and one or more scalable enhancement layers. For SVC, the base layer typically carries video data with a base spatial, temporal and/or quality level. One or more enhancement layers carry additional video data to support higher spatial, temporal and/or quality levels. Enhancement layers may, for example, add spatial resolution to frames of the base layer, or may add additional frames to increase the overall frame rate. In some instances, the base layer may be transmitted in a manner that is more reliable than the transmission of enhancement layers. As such, devices located farther from the source of the encoded video or with lower decoder capabilities may be able to receive the base layer, and thus the video sequence, albeit at the lowest spatial, temporal and/or quality level.

SUMMARY

This disclosure describes scalable video coding techniques that allow entropy encoding of the enhancement layer bit stream in a single coding pass. Conventionally, the enhancement layer bit stream is encoded using multiple coding passes. For each video block of the enhancement layer, for example, a first coding pass may gather statistics for the block to use in selecting coding tables (or codebooks) for entropy coding the block, and a second coding pass may entropy encode the block using the selected coding tables. In accordance with the techniques in this disclosure, however, video blocks of the enhancement layer bit stream are entropy encoded without performing a first coding pass to gather statistics to use in video coding table selection.

Instead, the enhancement layer is encoded using a coding technique that encodes the coefficients of the enhancement layer on a coefficient-by-coefficient basis in a single coding pass. In one instance, a video encoder may, for each of the nonzero coefficients of the enhancement layer video block, encode an end of block (EOB) symbol, a run length and a sign. The video encoder may use only a single coding table to encode the video block of the enhancement layer, thereby eliminating the need to perform a first coding pass to collect statistics to be used in selecting coding tables.

Additionally, the video encoder may not encode a magnitude of the nonzero coefficients in the enhancement layer. In this manner, the magnitude of all the nonzero coefficients of the enhancement layer may be limited to a magnitude of one. Not encoding the magnitudes of the coefficients of the enhancement layer may result in some loss in peak signal to noise ratio (PSNR), but reduces the number of bits used to encode the enhancement layer. The techniques of this disclosure may provide several advantages. For example, the techniques may reduce coding complexity, coding delay and memory requirements for encoding the enhancement layer bit stream while maintaining coding efficiency.

In one aspect, a method for encoding video data using scalable video coding comprises encoding a video block at a first quality as part of a base layer bit stream. The method also includes encoding, as part of at least one enhancement layer bit stream, refinements of the video block that when combined with the video block encoded at the first quality results in the video block having a second quality that is greater than the first quality. The method also includes the refinements of the video block be encoded in a single encoding pass.

In another aspect, a device for encoding video data using scalable video coding comprises at least one encoder that encodes a video block at a first quality as part of a base layer bit stream and encodes, as part of at least one enhancement layer bit stream, refinements of the video block that when combined with the video block encoded at the first quality results in the video block having a second quality that is greater than the first quality. The refinements of the video block are encoded in a single encoding pass.

In another aspect, a computer-readable medium comprising instructions to cause one or more processors to encode a video block at a first quality as part of a base layer bit stream; and encode, as part of at least one enhancement layer bit stream, refinements of the video block that when combined with the video block encoded at the first quality results in the video block having a second quality that is greater than the first quality. The refinements of the video block are encoded in a single encoding pass.

In another aspect, a device for encoding video data using scalable video coding comprises first means for encoding a video block at a first quality as part of a base layer bit stream and second means for encoding, as part of at least one enhancement layer bit stream, refinements of the video block that when combined with the video block encoded at the first quality results in the video block having a second quality that is greater than the first quality. The refinements of the video block are encoded in a single encoding pass.

In another aspect, a method for decoding video data using scalable video coding comprises decoding a base layer bit stream to obtain a video block at a first quality and decoding an enhancement layer bit stream to obtain refinements of the video block that, when combined with the video block decoded at the first quality, result in the video block having a second quality. Decoding the enhancement layer includes decoding, for each nonzero coefficient of the refinements of the video block, a symbol indicating there is at least one remaining nonzero coefficient, a run length indicating a number of zero valued coefficients preceding the nonzero coefficient and a sign of the nonzero coefficient.

In another aspect, a device for decoding video data using scalable video coding comprises at least one decoder that decodes a base layer bit stream to obtain a video block at a first quality and decodes an enhancement layer bit stream to obtain refinements of the video block that, when combined with the video block decoded at the first quality, result in the video block having a second quality. The at least one decoder decodes for each nonzero coefficient of the refinements of the video block, a symbol indicating there is at least one remaining nonzero coefficient, a run length indicating a number of zero valued coefficients preceding the nonzero coefficient and a sign of the nonzero coefficient.

In another aspect, a computer-readable medium comprising instructions to cause one or more processors to decode a base layer bit stream to obtain a video block at a first quality; and decode an enhancement layer bit stream to obtain refinements of the video block that, when combined with the video block decoded at the first quality, result in the video block having a second quality. The instructions cause the one or more processors to decode for each nonzero coefficient of the refinements of the video block, a symbol indicating there is at least one remaining nonzero coefficient, a run length indicating a number of zero valued coefficients preceding the nonzero coefficient and a sign of the nonzero coefficient.

In another aspect, a device for decoding video data using scalable video coding comprises first means for decoding a base layer bit stream to obtain a video block at a first quality and second means for decoding an enhancement layer bit stream to obtain refinements of the video block that, when combined with the video block decoded at the first quality, result in the video block having a second quality. The second decoding means decodes, for each nonzero coefficient of the refinements of the video block, a symbol indicating there is at least one remaining nonzero coefficient, a run length indicating a number of zero valued coefficients preceding the nonzero coefficient and a sign of the nonzero coefficient.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
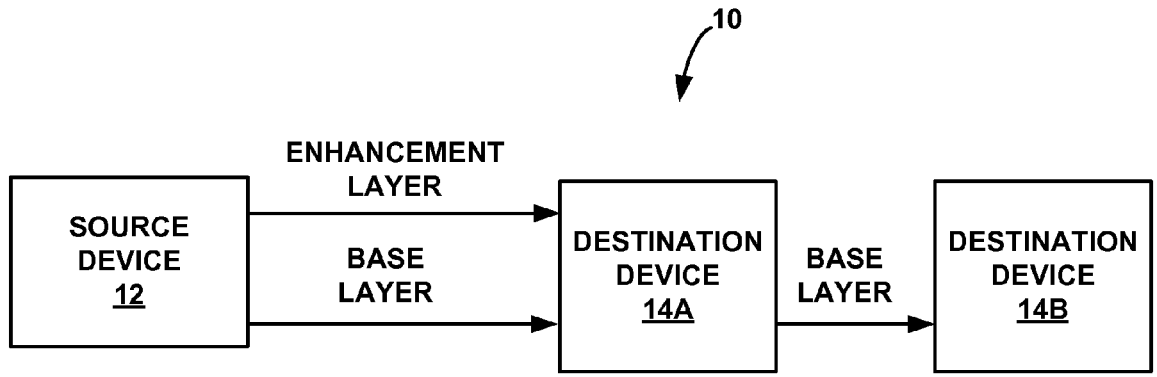
FIG. 1 is a block diagram illustrating a video transmission system that supports video scalability.

FIG. 1 is a block diagram illustrating a video transmission system 10 that supports video scalability. In the example of FIG. 1, video transmission system 10 includes a source device 12 and multiple destination devices 14A, 14B (collectively, "destination devices 14"). Source device 12 obtains digital video content from one or more sources, and encodes the video content for transmission to destination devices 14. The video content may, for example, be captured in real-time or near real-time, archived (e.g., pre-captured), computer-generated, or a combination thereof. In each case, the video content may be encoded by source device 12 for transmission to destination devices 14 via a communication channel. Source device 12 may include or be coupled to a transmitter that includes appropriate radio frequency (RF) modulation, filtering, and amplifier components to drive one or more antennas to deliver encoded video over the communication channel.

To support scalable video, source device 12 encodes the source video as a base layer bit stream (or base layer) and one or more scalable enhancement layer bit streams (or enhancement layers). The base layer bit stream typically carries video data with a base quality level. One or more enhancement layers carry additional video data, referred to herein as refinements, to support higher quality levels. The refinements encoded in the enhancement layers may, for example, progressively increase the fidelity (e.g., visual quality) by providing additional higher frequency coefficients or further refining existing coefficients. In some instances, the base layer may be transmitted in a manner that is more reliable than the transmission of enhancement layers, e.g., at a lower packet error rate (PER).

In the example illustrated in FIG. 1, a base layer and a single enhancement layer of one channel is shown for simplicity. However, source device 12 may encode more than one enhancement layer carrying additional video data of the channel. In some instances, source device 12 may encode the source video in separate bit streams to support different channels for selection by users associated with destination devices 14. The channels are transmitted generally simultaneously such that destination devices 14 can select a different channel for viewing at any time. Hence, destination devices 14, under user control, may select one channel to view sports and then select another channel to view the news or some other scheduled programming event, much like a television viewing experience. In general, each channel may be encoded as a base layer and one or more enhancement layers.

Moreover, the techniques of this disclosure are described in the context of quality scalability (also referred to as signal-to-noise rate (SNR) scalability) for illustrative purposes. However, the techniques may be extended to spatial scalability. In spatial scalability applications, the base layer carries the video data at a base spatial resolution and the enhancement layers carry additional video data to support higher spatial resolution. In some instances, system 10 may utilize video scalability that combines SNR, spatial and/or temporal scalability.

Source device 12 may, for example, encode the source video as the base layer in accordance with the SVC extension of the ITU-T H.264/MPEG-4, Part 10 AVC standard and encode the source video as the enhancement layer in accordance with the techniques described in this disclosure. As such, the techniques as described in this disclosure may, in some aspects, be applied to implement video scalability extensions for devices that otherwise conform to the H.264 standard. In fact, the techniques of this disclosure may represent potential modifications for future versions or extensions of the H.264 standard, or other standards. However, the techniques may be used in conjunction with any of a variety of other video compression standards, such as those defined in MPEG-1 and MPEG-2, the ITU-T H.263 standard, the Society of Motion Picture and Television Engineers (SMPTE) 421M video CODEC standard (commonly referred to as "VC-1"), the standard defined by the Audio Video Coding Standard Workgroup of China (commonly referred to as "AVS"), as well as any other video coding standard defined by a standards body or developed by an organization as a proprietary standard.

Destination devices 14 may support wired and/or wireless reception of the encoded video. Destination devices 14 may comprise any device capable of receiving and decoding digital video data, such as wireless communication devices, e.g., cellular or satellite radio telephones, wireless broadcast systems, personal digital assistants (PDAs), laptop or desktop computers, digital cameras, digital recording devices, video gaming devices, video game consoles, digital televisions, digital direct broadcast systems, and the like. In the example of FIG. 1, two destination devices 14A, 14B are shown. However, system 10 may include any number of destination devices 14. Destination devices 14 may also operate in accordance with any of the variety of video compression standards described above.

FIG. 1 represents positioning of destination devices 14 relative to source device 12 that transmits the encoded video. In particular, destination device 14A is closer to the transmission source, i.e., source device 12 in FIG. 1, and destination device 14B is further away from the transmission source. In cases in which the base layer is encoded at a lower PER, both destination devices 14A and 14B may reliably receive and decode the base layer. Destination device 14A, which is situated closer to source device 12, may also reliably receive the enhancement layer. However, destination device 14B, which is situated further away from source device 12, may not reliably receive the enhancement layer, e.g., due to network or channel conditions.

As such, the closer destination device 14A is capable of higher quality video because both the base layer and enhancement layer data are available, whereas destination device 14B is capable of presenting only the minimum quality level provided by the base layer data. Hence, the video obtained by destination devices 14 is scalable in the sense that the additional bits of the enhancement layer can be decoded and added to the base layer bit stream to increase the signal to noise ratio (SNR) of the decoded video. However, scalability is only possible when the enhancement layer data is present. Thus, the term "quality" as used in this disclosure may refer to an objective and/or subjective visual quality. In other words, the enhancement layer refinements result in video data that is a higher quality reproduction of original data. In this manner, the fidelity of video is increased by the enhancement layer.

In other instances, the network or channel conditions may be sufficient for both destination devices 14A and 14B to receive the base layer and the enhancement layer. However, destination devices 14A and 14B may have different decoder capabilities that prevent one of destination devices 14A and 14B from using the additional video data of the enhancement layer to produce higher quality video. If one of destination devices 14 is a client device such as a mobile handset, or other small, portable device, for example, there may be limitations due to computational complexity and memory requirements. Accordingly, scalable video coding can be designed in such a way that destination devices 14 with limited computational or memory resources may only decode the base layer. In this manner, destination devices 14 with better network or channel conditions and/or higher decoder capabilities will be able to reconstruct video with higher video quality using the additional video data of the enhancement layer.

The techniques described in this disclosure make use of entropy coding techniques that promote efficient coding of enhancement layer bit streams. The entropy coding techniques of this disclosure may enable the coding of additional video data, e.g., in the form of refinements, in the enhancement layer bit stream in a single encoding pass, thereby reducing coding complexity, coding delay and memory requirements. As will be described in further detail, source device 12 may, in some instances, encode each nonzero coefficient of a coefficient vector of the enhancement layer without knowledge of any subsequent coefficients, i.e., any coefficients following the nonzero coefficient currently being coded. Coding the enhancement layer in a single pass may eliminate the need to perform a first pass to analyze the coefficient vector and a second pass for coding the coefficient vector based on the analysis.

For example, some conventional entropy encoders may perform a first encoding pass to generate symbols to represent the coefficient vector with at least some of the symbols representing more than one nonzero coefficient. In other words, knowledge of subsequent coefficients is needed to encode the nonzero coefficients of the coefficient vector. Additionally, or alternatively, some conventional entropy encoders may also select, during the first or a subsequent encoding pass, VLC tables for use in encoding the symbols. In one aspect, VLC tables may be selected based on the generated symbols. Alternatively, statistics may be gathered by analyzing the coefficient vector during the first encoding pass and the VLC tables may be selected based on the collected statistics.

A second encoding pass is then performed by the conventional entropy encoder to entropy encode the coefficient vector based on the analysis performed during the first encoding pass. As one example, some conventional entropy encoders may, during the second encoding pass, encode the symbols generated during the first pass using the VLC tables selected based on the generated symbols or other statistics. Generating symbols that represent more than one nonzero coefficient and/or selecting VLC tables based on the generated symbols or other statistics may allow more efficiently encoding of the coefficient vector.

Not only do the techniques of this disclosure eliminate the need for more than one encoding pass to encode the enhancement layer, but the entropy coding techniques of this disclosure may additionally result in coding the enhancement layer without storing and accessing coefficient information of the video data of the base layer, further reducing computational complexity and memory requirements.

Source device 12, destination device 14 or both may be a wireless or wired communication device as described above. Also, source device 12, destination device 14 or both may be implemented as an integrated circuit device, such as an integrated circuit chip or chipset, which may be incorporated in a wireless or wired communication device, or in another type of device supporting digital video applications, such as a digital media player, a personal digital assistant (PDA), a digital television, or the like.

Figure 2:
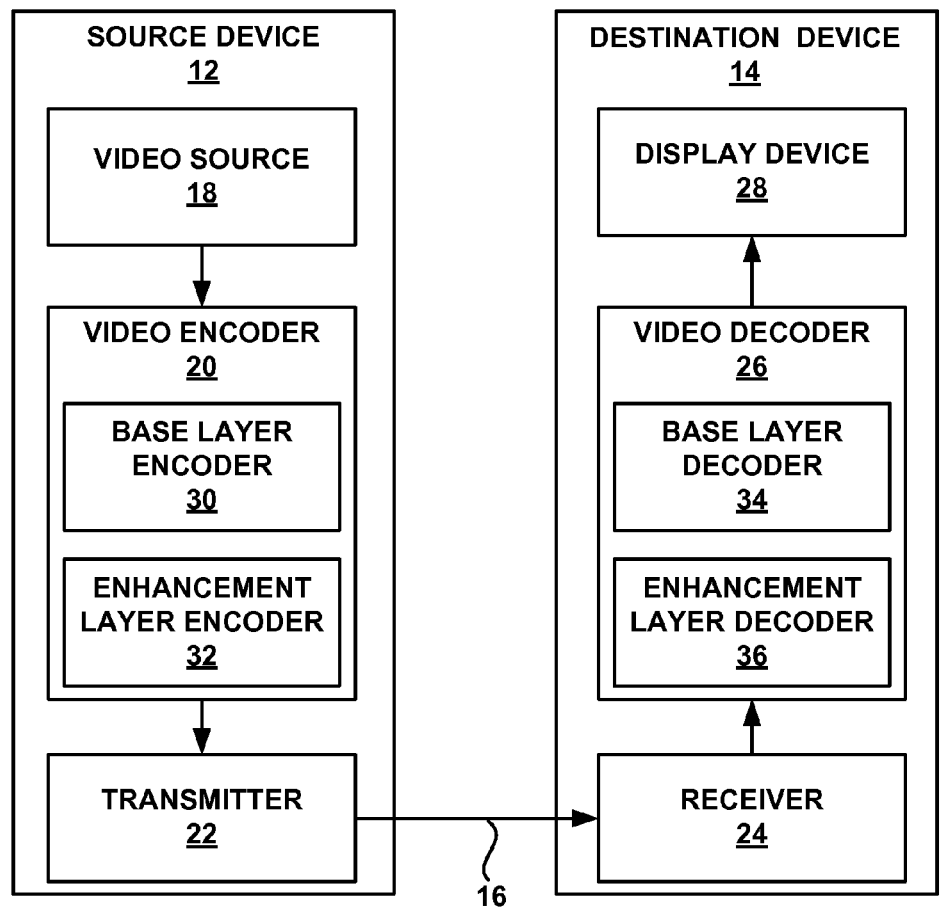
FIG. 2 is a block diagram illustrating a source device and a destination device of the coding system of FIG. 1 in further detail.

FIG. 2 is a block diagram illustrating a source device 12 and a destination device 14 of coding system 10 in further detail. Destination device 14 may, for example, be either of destination devices 14A or 14B of FIG. 1. As shown in FIG. 2, source device 12 may include a video source 18, a video encoder 20, and a transmitter 22. Video source 18 of source device 12 may include a video capture device, such as a video camera, a video archive containing previously captured video, or a video feed from a video content provider. As a further alternative, video source 18 may generate computer graphics-based data as the source video, or a combination of live video and computer-generated video. In some cases, source device 12 may be a so-called camera phone or video phone, in which case video source 18 may be a video camera. In each case, the captured, pre-captured, or computer-generated video may be encoded by video encoder 20 for transmission from source device 12 to destination device 14 via transmitter 22 and communication channel 16.

Video encoder 20 receives video data from video source 18 and encodes the video data as a base layer bit stream and one or more enhancement layer bit streams. In the example illustrated in FIG. 2, video encoder 20 includes a base layer encoder 30 and an enhancement layer encoder 32. Base layer encoder 30 and enhancement layer encoder 32 receive common video data from video source 18. Base layer encoder 30 encodes the video data at a first bit rate to generate a base layer bit stream of the video at a first quality level. Enhancement layer encoder 32 encodes additional bits to generate one or more enhancement layers that, when added to bit level of the base layer, enhance the video to a second, higher quality level. In other words, the enhancement layer, when added to the base layer, provides a second, higher bit rate that provides the higher quality level. As such, the enhancement layer may be viewed as encoding refinements of the video data encoded in the base layer. The refinements may, for example, be additional coefficients and/or refinements to existing coefficients. The refinements encoded in the enhancement layers may be hierarchical in the sense that the refinements in the enhancement layers progressively increase the quality of the video data as they are decoded. As such, decoding of the refinements of all enhancement layers, for example, will result in the highest bit rate and maximum quality, while decoding of only the refinements of a first enhancement layer will produce an incremental increase in bit rate and quality relative to the decoding of only the base layer.

The video data received from video source 18 may be a series of video frames. Base layer encoder 30 and enhancement layer encoder 32 divide the series of frames into coded units and process the coded units to encode the series of video frames. The coded units may, for example, be entire frames or portions of the frames, such as slices of the frames. Base layer encoder 30 and enhancement layer encoder 32 divide each coded unit into blocks of pixels (referred to herein as video blocks or blocks) and operate on the video blocks within individual coded units in order to encode the video data. As such, the video data may include multiple frames, a frame may include multiple slices, and a slice may include multiple video blocks.

The video blocks may have fixed or varying sizes, and may differ in size according to a specified coding standard. As an example, ITU-T H.264/MPEG-4, Part 10 AVC supports intra prediction in various block sizes, such as 16×16, 8×8, or 4×4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In H.264/MPEG-4 Part 10 AVC, each video block, often referred to as a macroblock (MB), may be sub-divided into sub-blocks of fixed or varying sizes. That is, the coded unit may contain sub-blocks of the same or different sizes. In general, MBs and the various sub-blocks may be considered to be video blocks. Thus, MBs may be considered to be video blocks, and if partitioned or sub-partitioned, MBs can themselves be considered to define sets of video blocks.

Encoders 30, 32 perform intra- and inter-coding of the video blocks of the frames. Intra-coding relies on spatial prediction to reduce or remove spatial redundancy in video data within a given coded unit, e.g., frame or slice. For intra-coding, encoders 30, 32 form a spatial prediction block based on one or more previously encoded blocks within the same frame as the block currently being coded. The prediction block may be a predicted version of the video block currently being coded. Base layer encoder 30 may generate the prediction block based on one or more previously encoded blocks within the frame, e.g., by performing interpolation (in accordance with an intra-coding mode associated with the block) using pixel values of one or more previously encoded blocks within the base layer of the current frame. Enhancement layer encoder 32 may generate the prediction block based on one or more previously encoded blocks within the frame. Enhancement layer encoder 32 may, for example, generate the prediction block based on one or more previously encoded video blocks from the base layer and the enhancement layer within the frame. For example, enhancement layer encoder 32 may generate the prediction block using a weighted sum of pixel values from at least one previously encoded video block from the base layer and at least one previously encoded video block from the enhancement layer.

Inter-coding relies on temporal prediction to reduce or remove temporal redundancy within adjacent frames of the video sequence. For inter-coding, encoders 30, 32 perform motion estimation to track the movement of closely matching video blocks between two or more adjacent frames within the coded unit. In the case of inter-prediction, encoders 30, 32 may generate a temporal prediction block based on one or more previously encoded blocks from other frames within the coded unit. Encoders 30, 32 may, for example, compare the current video block to blocks in one or more adjacent video frames to identify a block in the adjacent frame that most closely matches the current video block, e.g., a block in the one or more adjacent frames that has a smallest means squared error (MSE), sum of squared differences (SSD), sum of absolute differences (SAD), or other difference metric. Encoders 30, 32 select the identified block in the adjacent frame as the prediction block. Base layer encoder 30 compares the current video block to blocks in one more adjacent frames of the base layer. Enhancement layer encoder 32 may compare the current video block to blocks in one or more adjacent frames in the base layer and/or the enhancement layer.

Following intra- or inter-based prediction of the video blocks, encoders 30, 32 generate a residual block by subtracting the generated prediction block from the original video block that is being coded. The residual block is thus indicative of the differences between the prediction block and the current block being coded. Encoders 30, 32 may apply transform, quantization and entropy coding processes to further reduce the bit rate associated with communication of the residual block. The transform techniques, which may include discrete cosine transform (DCT), integer transform, wavelet transform, directional transform or other transform operation, change a set of pixel difference values into residual transform coefficients that represent the energy of the pixel difference values in the frequency domain. Encoders 30, 32 apply quantization to the residual transform coefficients, which generally involves a process that limits the number of bits associated with any given coefficient. Encoders 30, 32 scan the two-dimensional residual block to generate a one-dimensional vector of coefficients and entropy encode the coefficient vector to further compress the residual coefficients. Entropy encoding may, for example, include variable length coding (VLC), arithmetic coding, fixed length coding, context-adaptive VLC (CAVLC), context-adaptive binary arithmetic coding (CABAC), and/or other entropy coding techniques.

SNR scalability may be achieved by residual quantization. In particular, base layer encoder 30 may quantize the residual transform coefficients using a first quantization parameter (QP) and enhancement layer encoder 32 may quantize the residual transform coefficients using a second QP. In ITU-T H.264/MPEG-10 AVC, larger QPs typically result in the video data being encoded at a lower quality with a smaller number of bits, while smaller QPs result in the video data being encoded at a higher quality with a larger number of bits. As such, base layer encoder 30, which encodes the video data at a minimum quality level, may quantize the coefficients of the base layer using a larger QP value than the QP value used by enhancement layer encoder 32 to quantize the coefficients of the enhancement layer. As a result, the quantized residual transform coefficients from base layer encoder 30 represent the video sequence at a first quality and the quantized residual transform coefficients from the enhancement layer encoder represent additional coefficients or refinements to existing coefficients of the video sequence, that when combined with the base layer increase the quality of the video sequence to a second, higher quality.

Encoders 30, 32 each receive a one-dimensional coefficient vector that represents the quantized residual transform coefficients of the base layer and enhancement layer, respectively. In other words, base layer encoder 30 receives a vector of coefficients of the base layer and enhancement layer encoder 32 receives a vector of coefficients of a corresponding enhancement layer. Although encoders 30, 32 receive the same original video data, the vectors of coefficients may be different. This may be due to base layer encoder 30 and enhancement layer encoder 32 generating different prediction blocks, e.g., base layer encoder 30 generates a prediction block from one or more previously encoded base layer blocks and enhancement layer encoder 32 generates the prediction block from one or more previously encoded base layer blocks and enhancement layer blocks.

Base layer encoder 30 and enhancement layer encoder 32 each encode the respective coefficient vectors to generate a base layer bit stream and at least one enhancement layer bit stream, respectfully. In accordance with the techniques of this disclosure, base layer encoder 30 and enhancement layer encoder 32 encode the respective coefficient vectors using different coding techniques. Base layer encoder 30 may encode the coefficient vector using a multiple encoding pass process in which base layer encoder 30 analyzes the coefficient vector during at least one encoding pass and encodes the coefficient vector during at least one subsequent encoding pass based on the analysis. In one instance, base layer encoder 30 may encode the quantized residual transform coefficients of the base layer coefficient vector in accordance with CAVLC as defined in the H.264/MPEG-4, Part 10 AVC standard. CAVLC as defined in the H.264/MPEG-4, Part 10 AVC standard may encode the base layer coefficient vector using multiple encoding passes.

During the first encoding pass, base layer encoder 30 may generate symbols to represent the coefficient vector at least some of which represent more than one nonzero coefficient and, in some cases, all of the coefficients of the coefficient vector. Base layer encoder 30 may, e.g., in accordance with CAVLC as defined in the H.264/MPEG-4, Part 10 AVC standard, generate symbols that represent a total number of coefficients in the coefficient vector ("TotalCoeffs"), a number of trailing ones in the coefficient vector ("T1s"), signs of any trailing ones, magnitudes (or levels) of nonzero coefficients other than the trailing ones, sum of all runs ("sumRuns"), and a run before each nonzero coefficient. To generate some of the symbols, such as TotalCoeff and sumRuns, base layer encoder 30 may analyze the entire coefficient vector.

During the first encoding pass, base layer encoder 30 may also select VLC tables to use during a subsequent encoding pass based on the analysis of the coefficient vector. In some instances, base layer encoder 30 may select VLC tables to use during the subsequent (e.g., second) encoding pass based on the symbols generated during the first coding pass. For example, base layer encoder 30 may select a VLC table to use when encoding the sumRuns symbol based upon the total number of coefficients in the block (TotalCoeffs) as there is some relationship between these two values. In particular, as TotalCoeffs increases, sumRuns decreases and as TotalCoeffs decreases, sumRuns increases. Again, selecting the VLC table to use when encoding the sumRuns symbol based upon the total number of coefficients in the block (TotalCoeffs) may allow base layer encoder 30 to select a VLC table that more efficiently encodes sumRuns. Similar VLC table selection may be performed for other symbols to be encoded or using other gathered statistics.

Base layer encoder 30 encodes, during the second or other subsequent encoding pass, the symbol that represents a total number of nonzero coefficients in the coefficient vector (TotalCoeff) and the symbol that represents a number of trailing ones (referred to as T1s). The number of trailing ones is the number of coefficients with a magnitude of one that occur in the coefficient vector before a coefficient with magnitude greater than one occurs when the coefficient vector is read in reverse order, i.e., starting from the end of the coefficient vector. Base layer encoder 30 may select a VLC table to use in encoding the TotalCoeff and T1 symbols based upon a predicted number of nonzero coefficients, and encode the Total-Coeff and T1 symbols using the selected VLC table. Selecting the VLC table to use in encoding the TotalCoeff and T1 symbols based on the predicted number of nonzero coefficients may allow base layer encoder 30 to select a VLC table that more efficiently encodes the TotalCoeff and T1 symbols. As such, the different VLC tables may be more efficient for different predicted number of nonzero coefficients. In one example, base layer encoder 30 may predict the number of nonzero coefficients in current block based on the number of nonzero coefficients of one or more previously encoded video blocks, e.g., an upper neighboring video block and a left neighboring video block.

Base layer encoder 30 may encode the signs of any trailing ones. For example, base layer encoder 30 may, for each of the trailing ones, encode a '1' if the sign of the trailing one is positive and encode a '0' if the sign of the trailing one is negative. As such, base layer encoder 30 may not need to perform VLC table selection for the signs. Base layer encoder 30 may encode the magnitudes of the nonzero coefficients other than the trailing ones. Base layer encoder 30 may encode the levels of the nonzero coefficients using a VLC table, fixed length coding or other type of entropy coding. For example, base layer encoder 30 may encode the levels of the nonzero coefficients using binary coding.

Base layer encoder 30 may encode the symbol that represents the number of zero valued coefficients that occur in the coefficient vector before the last nonzero coefficient (sumRuns). As described above, base layer encoder 30 may select a VLC table to use when encoding the sumRuns symbol based upon the total number of coefficients in the block (TotalCoeffs) as there is some relationship between these two values.

Base layer encoder 30 may encode the runs (or run lengths) that occur before each nonzero coefficient starting from the last nonzero coefficient of the coefficient vector. The run lengths are the number of zero valued coefficients that precede the nonzero coefficient. Thus, base layer encoder 30 may encode the run length (i.e., the number of zero valued coefficients) before the last nonzero coefficient of the coefficient vector first, followed by the run length before the preceding nonzero coefficient, and so on until the run length before the first nonzero coefficient of the coefficient vector is encoded.

Base layer encoder 30 may select the VLC table to use to encode each of the run lengths separately. Base layer encoder 30 may select the VLC table to use to encode the current run value based upon the sum of the runs (sumRuns) symbol and the sum of the runs coded so far. As an example, if a coefficient vector has a sum of runs (sumRuns) of eight, and the run encoded before the last nonzero coefficient encoded was six, then all remaining runs must be zero, one or two. Because the possible run length gets progressively shorter as each additional run is encoded, base layer encoder 30 may select more efficient VLC tables to reduce the number of bits used to represent the runs.

In this manner, base layer encoder 30 performs multiple pass encoding to encode the base layer coefficients, including a first pass to analyze the coefficient vector of the base layer residual block, e.g., to generate symbols and/or select VLC tables, and a second encoding pass to encode the coefficient vector based on the analysis. Although base layer encoder 30 is described above as encoding the quantized residual transform coefficients using CAVLC as defined in the H.264/MPEG-4, Part 10 AVC standard, base layer encoder 30 may use other coding methodologies to encode the quantized residual transform coefficients.

Enhancement layer encoder 32 encodes the quantized residual transform coefficients of the enhancement layer, which may be in the form of a coefficient vector. Enhancement layer encoder 32 may generate quantized residual coefficients that are different from the quantized residual coefficients of the base layer. The quantized residual coefficients of the enhancement layer may be different than the quantized residual coefficients of the base layer due to the use of a different QP during quantization. Additionally, the quantized residual transform coefficients may be different than the quantized residual transform coefficients of the base layer because the residual block represents the difference between the original video block and the prediction block generated using previously encoded blocks form the base layer and the enhancement layer. The residual block of the base layer is the difference between original video block and the prediction block generated using only previously encoded blocks from the base layer. As such, the enhancement layer may include additional coefficients and/or refinements to existing coefficients. In this sense, the quantized residual transform coefficients of the video block in the enhancement layer represent refinements to the video block encoded at the first quality in the base layer and, when added to the base layer, provide higher quality video data.

Figure 3:
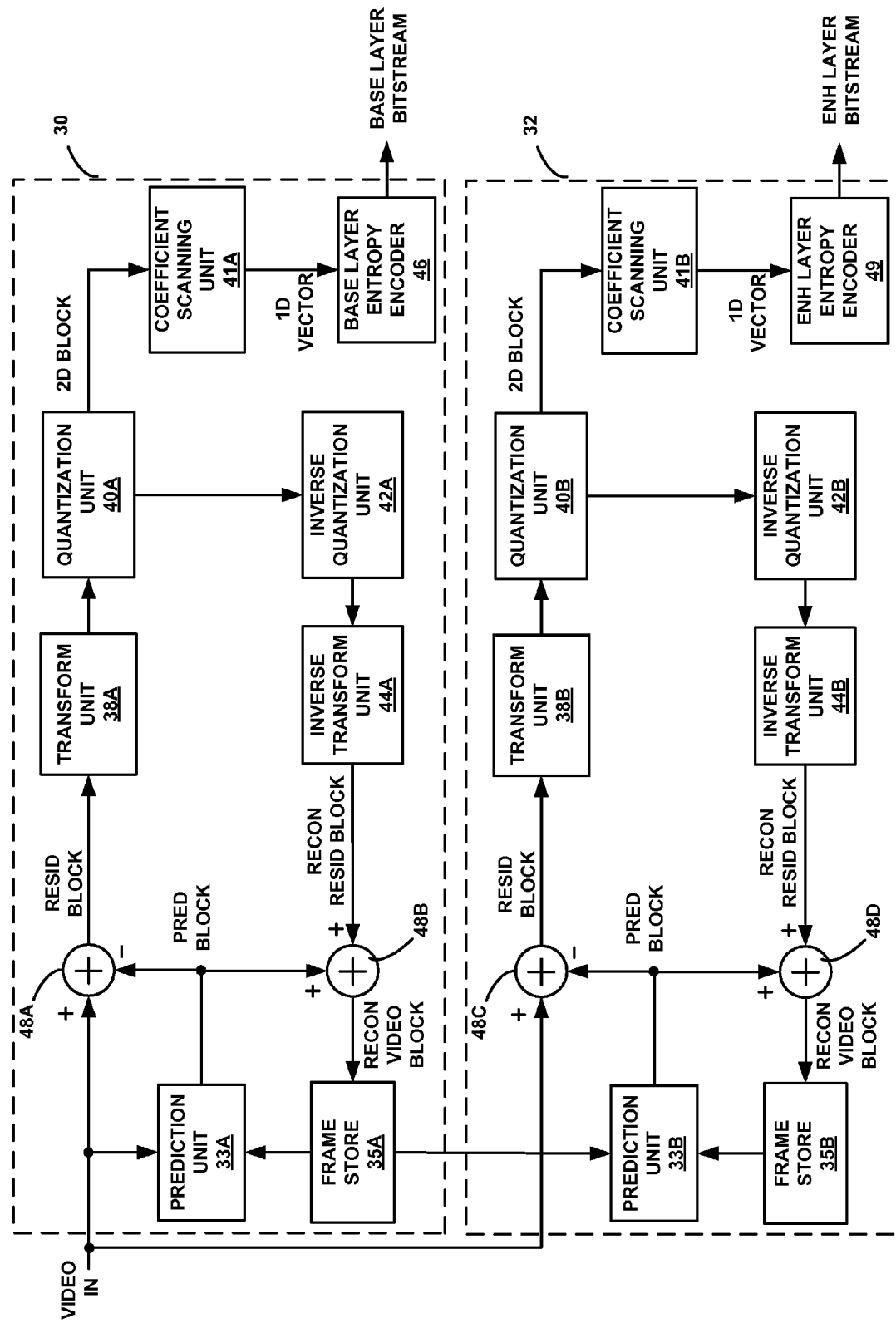
FIG. 3 is a block diagram illustrating an example base layer encoder and enhancement layer encoder in further detail.

Enhancement layer encoder 32 may discard one or more of the quantized residual coefficients of the coefficient vector during encoding depending on the available bit rate. For example, enhancement layer encoder 32 may discard coefficients corresponding to high frequency transform basis functions, e.g., coefficients located towards the end of the coefficient vector when coefficient scanning is done using zigzag scanning as illustrated in FIG. 3. Encoding the quantized residual coefficients in accordance with CAVLC as defined in the H.264/MPEG-4, Part 10, AVC standard may not allow enhancement layer encoder 32 to discard coefficients because at least some of the symbols to be encoded, e.g., TotalCoeffs and sumRuns, refer to all the coefficients in the block. If enhancement layer encoder 32 discards one or more of the coefficients of the coefficient vector, the received information would be redundant, thus leading to lower coding efficiency. Moreover, because the decoder must receive runs for all the nonzero coefficients in the block to be able to properly decode the position of each coefficient in the zigzag scan when encoding using CAVLC as defined in the H.264/MPEG-4, Part 10, AVC standard, enhancement layer encoder 32 may not be able to discard coefficients from the coefficient vector of the enhancement layer.

As such, enhancement layer encoder 32 encodes the coefficients of the enhancement layer or layers in accordance with the coding techniques of this disclosure. Enhancement layer encoder 32 encodes the quantized residual transform coefficients of the coefficient vector in a single encoding pass. In other words, enhancement layer encoder 32 does not perform a first pass to analyze the coefficient vector and then encode the symbols during a second pass based on the analysis. Instead, enhancement layer encoder 32 starts from the beginning of the coefficient vector and encodes each of the nonzero coefficients one-by-one in a single encoding pass. In this manner, enhancement layer encoder 32 may encode each of the nonzero coefficients without analyzing any subsequent coefficients in the coefficient vector, i.e., without knowledge of any subsequent coefficients of the coefficient vector.

In one aspect, enhancement layer encoder 32 may, for each of the nonzero coefficients, encode a symbol indicating that there is at least one remaining nonzero coefficient in the coefficient vector. The symbol may, for example, be an end-of-block (EOB) symbol. Enhancement layer encoder 32 may encode the symbol using a single bit. For example, enhancement layer encoder 32 may encode a zero when there is at least one remaining non-zero coefficient, e.g., at least the current nonzero coefficient, and encode a one when there are no more remaining nonzero coefficients.

Following the EOB symbol of each coefficient, enhancement layer encoder 32 encodes the run before the current nonzero coefficient. As described above, the run represents the number of zero valued coefficients that occur between the previous nonzero coefficient of the coefficient vector, or the beginning of the coefficient vector in the case of the first nonzero coefficient, and the current nonzero coefficient. Enhancement layer encoder 32 may encode the runs using a single VLC table. In one instance, enhancement layer encoder 32 may encode the runs using the VLC table used in CAVLC as defined in the H.264/MPEG-4, Part 10, AVC standard to code sumRuns when TotalCoeffs is equal to one. In other words, enhancement layer encoder 32 may reuse one of the VLC tables already maintained by video encoder 20. In other instances, enhancement layer encoder 32 may use one of the other VLC tables already maintained by video encoder 20 to encode the runs. Alternatively, enhancement layer encoder 32 may maintain a separate VLC table specifically designed to encode the runs of the coefficient vector of the enhancement layer. In any case, enhancement layer encoder 32 may not need to adaptively select the VLC table to use for encoding the runs. Instead, enhancement layer encoder 32 may use a single VLC table, thus eliminating the need for a first pass to collect statistics used to select the VLC table.

Following the encoded runs of each coefficient, enhancement layer encoder 32 encodes a sign of the nonzero coefficient. Enhancement layer encoder 32 may, for example, encode a '1' if the sign of the nonzero coefficient is positive and encode a '0' if the sign of the nonzero coefficient is negative. Enhancement layer encoder 32 may adjust the magnitude of the nonzero coefficients by setting the magnitudes of the nonzero coefficients to one. In some instances, enhancement layer encoder 32 may not encode a magnitude of the nonzero coefficients. In this manner, enhancement layer encoder 32 may limit the magnitude of the nonzero coefficients to be one. Destination device 14 is then configured to decode all nonzero coefficients identified in the refinements to have a magnitude equal to one. Not encoding the magnitudes of the coefficients of the enhancement layer may result in some loss in peak signal to noise ratio (PSNR), but reduces the number of bits used to encode the coefficients.

In this manner, enhancement layer encoder 32 may encode the coefficients of the enhancement layer bit stream in a single pass, e.g., without knowledge of any subsequent coefficients in the coefficient vector. Since enhancement layer encoder 32 does not need to analyze the coefficient vector, e.g., to generate symbols representing more than one nonzero coefficient of the vector or to select VLC tables to encode symbols, only one encoding pass is performed. Conventional encoders typically perform at least two passes; (1) a first pass to analyze the coefficient vector and (2) a second pass to encode the coefficient vector based on the analysis. Additionally, enhancement layer encoder 32 may encode the coefficients of the enhancement layer using a single VLC table, thus eliminating the need to perform an encoding pass to form symbols to use in adaptively selecting coding tables. In this manner, enhancement layer encoder 32 may reduce coding complexity, coding delay and memory requirements. Moreover, the entropy coding techniques of this disclosure may additionally result in coding the coefficients of the enhancement layer without storing and accessing coefficient information of the base layer, further reducing computational complexity and memory requirements.

Source device 12 transmits the encoded video data to destination device 14 via transmitter 22. Destination device 14 may include a receiver 24, video decoder 26, and display device 28. Receiver 24 receives the encoded video bit stream from source device 12 via channel 16. As described above, the encoded video bit stream includes a base layer bit stream and one or more enhancement layer bit streams. Video decoder 26 decodes the base layer and, if available, the one or more enhancement layers to obtain the video data.

In particular, video decoder 26 includes a base layer decoder 34 and an enhancement layer decoder 36. Base layer decoder 34 decodes the base layer bit stream received via channel 16 to produce the video data at a first quality for presentation on display device 28. Enhancement layer decoder 36 decodes the bit streams of the one or more enhancement layers to obtain additional video data, e.g., refinements, that increases the quality of the decoded video data to a second, higher quality. Again, the number of enhancement layers, e.g., one, two, three or more, received by destination device 14 may depend on channel conditions or other limitations. In addition, the number of received enhancement layers processed by enhancement layer decoder 36 may depend on decoder limitations. In general, the encoding and decoding of the base layer, in combination with a selected number of enhancement layers, permits incremental improvement in the SNR quality of the decoded video.

Base layer decoder 34 decodes the base layer to obtain the symbols representing the vector of the quantized residual coefficients of the base layer. Base layer decoder 34 may decode the base layer to obtain the total number of nonzero coefficients in the block, the number of trailing ones of the block, the signs of trailing ones, the magnitudes of coefficients other than trailing ones, the sum of all runs, and the runs before each of the nonzero coefficient. Base layer decoder 34 may further decode the base layer bit stream to identify VLC tables to use in decoding the base layer symbols. In other instances, base layer decoder 34 may select VLC tables to use based on previously decoded symbols. Using the decoded symbols, base layer decoder 34 may reconstruct the coefficient vector of the base layer.

Enhancement layer decoder 36 decodes the bit stream of the enhancement layer to obtain the refinements of the enhancement layer, e.g., in the form of a vector of additional residual coefficients or refinements to existing residual coefficients. In particular, enhancement layer decoder 36 decodes, using the same VLC table used by enhancement layer encoder 32, the runs and signs of the enhancement layer coefficients until an EOB symbol indicates that no more nonzero coefficients remain. Using the decoded symbols, enhancement layer decoder 36 reconstructs the coefficient vector of the enhancement layer block.

Decoders 34, 36 reconstruct each of the blocks of the coded unit using the decoded quantized residual coefficients. After generating the coefficient vectors, decoders 34, 36 reverse scan the coefficient vector to generate a two-dimensional block of quantized residual coefficients. Decoders 34, 36 inverse quantizes, i.e., de-quantizes, the quantized residual coefficients and apply an inverse transform, e.g., an inverse DCT, inverse integer transform, inverse wavelet transform or inverse directional transform, to the de-quantized residual coefficients to produce a residual block of pixel values.

Decoders 34, 36 sum a prediction block generated by decoders 34, 36 with the residual block of pixel values to form a reconstructed base layer video block and an enhancement layer video block, respectively. The base and enhancement layer video blocks are combined to form a video block with a higher resolution. Decoders 34, 36 generate the prediction block in the same manner as described above with respect to encoders 30, 32. Destination device 14 may display the reconstructed video blocks to a user via display device 28. Display device 28 may comprise any of a variety of display devices such as a cathode ray tube (CRT), a liquid crystal display (LCD), a plasma display, a light emitting diode (LED) display, an organic LED display, or another type of display unit.

In some instances, video encoder 20 and video decoder 26 are configured to provide scalable enhancement bit streams that can be arbitrarily truncated. Thus, system 10 can avoid the use of discrete enhancement layers that must be coded in their entirety in order to achieve scalability. In some embodiments, however, system 10 may be configured to support scalability using either a generalized fine granularity scalability (FGS) approach or discrete enhancement layers, e.g., on a selective basis.

Source device 12 and destination device 14 may operate in a substantially symmetrical manner. For example, source device 12 and destination device 14 may each include video encoding and decoding components. Hence, system 10 may support one-way or two-way video transmission between devices 12, 14, e.g., for video streaming, video broadcasting, or video telephony.

In some aspects, for video broadcasting, the techniques described in this disclosure may be applied to enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," published in July 2007 as Technical Standard TIA-1099 (the "FLO Specification"). That is to say, communication channel 16 may comprise a wireless information channel used to broadcast wireless video information according to the FLO Specification, or the like. The FLO Specification includes examples defining bit stream syntax and semantics and decoding processes suitable for the FLO Air Interface.

Alternatively, video may be broadcasted according to other standards such as DVB-H (digital video broadcast-handheld), ISDB-T (integrated services digital broadcast-terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple destination devices, each of which may be similar to destination device 14 of FIG. 1. Thus, although a single destination device 14 is shown in FIG. 1, for video broadcasting, source device 12 would typically broadcast the video content simultaneously to many destination devices.

In other examples, transmitter 22, communication channel 16, and receiver 24 may be configured for communication according to any wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM (Global System for Mobile Communication), GPRS (General packet Radio Service), or EDGE (enhanced data GSM environment), a TETRA (Terrestrial Trunked Radio) mobile telephone system, a wideband code division multiple access (WCDMA) system, a high data rate 1xEV-DO (First generation Evolution Data Only) or 1xEV-DO Gold Multicast system, an IEEE 402.18 system, a MediaFLO™ system, a DMB system, a DVB-H system, or another scheme for data communication between two or more devices.

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 26 may be included in one or more encoders or decoders, either of which may be integrated as part of a combined encoder/decoder (CODEC) in a respective mobile device, subscriber device, broadcast device, server, or the like. In addition, source device 12 and destination device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being transmitter 22 of source device 12 and receiver 24 of destination device 14 in FIG. 1.

FIG. 3 is a block diagram illustrating an example base layer encoder 30 and enhancement layer encoder 32 in further detail. In the example of FIG. 3, base layer encoder 30 includes a prediction unit 33A, frame store 35A, transform unit 38A, quantization unit 40A, coefficient scanning unit 41A, inverse quantization unit 42A, inverse transform unit 44A, base layer entropy encoder 46 and summers 48A and 48B ("summers 48"). Depiction of different features in FIG. 3 as units is intended to highlight different functional aspects of the devices illustrated and does not necessarily imply that such units must be realized by separate hardware or software components. Rather, functionality associated with one or more units may be integrated within common or separate hardware or software components.

Prediction unit 33A generates a prediction block using intra- or inter-prediction. The prediction block may be a predicted version of the current video block being coded. As described above, prediction unit 33A may generate the prediction block using intra-prediction based on one or more previously encoded blocks of the base layer within the same frame as the block currently being coded. Alternatively, prediction unit may generate the prediction block using inter-prediction based on one or more previously encoded blocks within one or more adjacent frames of the base layer. Prediction unit 33A may retrieve the previously encoded block from frame store 35A.

Following intra- or inter-based prediction of the video blocks, base layer encoder 30 generates a residual block by subtracting the prediction block produced by prediction unit 33A from the current video block at summer 48A. The residual block includes a set of pixel difference values that quantify differences between pixel values of the current video block and pixel values of the prediction block. The residual block may be represented in a two-dimensional block format (e.g., a two-dimensional matrix or array of pixel values). In other words, the residual block is a two-dimensional representation of the pixel values.

Transform unit 38A applies a transform to the residual block to produce residual transform coefficients. Transform unit 38A may, for example, apply a DCT, an integer transform, directional transform, wavelet transform, or a combination thereof. After applying the transform to the residual block of pixel values, quantization unit 40A quantizes the transform coefficients to further reduce the bit rate. Following quantization, inverse quantization unit 42A and inverse transform unit 44A may apply inverse quantization and inverse transformation, respectively, to reconstruct the residual block. Summer 48B adds the reconstructed residual block to the prediction block produced by prediction unit 33A to produce a reconstructed video block for storage in frame stores 35A. The reconstructed video block stored in frame store 34 may be used by prediction unit 32 of base layer encoder 30 to intra- or inter-code a subsequent video block. Additionally, as will be described in more detail below, the reconstructed video block stored in frame store 35A may be used by prediction unit 33B of enhancement layer encoder 32 to intra- or inter-code refinements of the video block in the enhancement layer.

Following quantization, coefficient scanning unit 41A scans the coefficients from the two-dimensional block format to a one-dimensional vector format, a process often referred to as coefficient scanning. Coefficient scanning unit 41A may, for example, scan the two-dimensional block of coefficients using a zigzag scan order as described in further detail in FIG. 7. Following scanning, base layer entropy encoder 46 entropy encodes the coefficients of the one-dimensional vector. Base layer encoder 46 may, for example, entropy encode the coefficients of the coefficient vector using CAVLC as defined in the H.264/MPEG-4, Part 10 AVC standard and described in detail above with respect to FIG. 2.

Enhancement layer encoder 32 includes a prediction unit 33B, frame store 35B, transform unit 38B, quantization unit 40B, coefficient scanning unit 41B, inverse quantization unit 42B, inverse transform unit 44B, an enhancement layer entropy encoder 49 and summers 48C and 48D ("summers 48"). The units of enhancement layer encoder 32 are substantially similar to those of like-numbered units of base layer encoder 30. As such, only the differences will be described.

Prediction unit 33B of enhancement layer encoder 32 generates a prediction block that is a predicted version of the current video block. Unlike prediction unit 33A of base layer encoder 30, which only uses previously encoded blocks of the base layer to generate the prediction block, prediction unit 33B of enhancement layer encoder 32 may generate the prediction block based on one or more previously encoded blocks of the base layer and the enhancement layer. In other words, prediction unit 33B may generate the prediction block using a reconstructed video block from the base layer and the reconstructed video block of the enhancement layer. For example, prediction unit 33B may combine a reconstructed video block of the base layer with a reconstructed block of the enhancement layer to generate a prediction block at a second, higher quality.

Because the prediction block generated by prediction unit 33B is generated based on the reconstructed video blocks of both the base and enhancement layer, the residual block generated a summer 48C represents differences between the current video block and a previously encoded block constructed from the base and enhancement layer, i.e., at a second, higher visual quality.

Quantization unit 40B of enhancement layer encoder 32, although operationally similar to quantization unit 40A of base layer encoder 30, may use a different QP to quantize the transform coefficients. As described above with respect to FIG. 2, SNR scalability may be achieved by using different quantization parameters. For example, when base layer encoder 30 and enhancement layer encoder 32 operate in accordance with ITU-T H.264/MPEG-10 AVC, quantization unit 40A may encode the video data using a larger QP value than the QP value used by quantization unit 40B. As a result, the quantized residual transform coefficients from base layer encoder 30 represent the video sequence at a first quality and the quantized residual transform coefficients from the enhancement layer encoder 32 represent additional coefficients or refinements of existing coefficients of the video sequence, that when combined with the base layer, increase the quality of the video sequence to a second, higher visual quality.

Moreover, as described in detail with respect to FIG. 2, enhancement layer entropy encoder 49 encodes the quantized residual transform coefficients in a single encoding pass. In other words, enhancement layer entropy encoder 49 may encode each nonzero coefficient of a coefficient vector of the enhancement layer without knowledge of any subsequent coefficients of the coefficient vector. Coding the enhancement layer in a single pass may eliminate the need to perform a first pass to analyze the coefficient vector and a second pass for coding the coefficient vector based on the analysis. Instead, enhancement layer entropy encoder 49 starts from the beginning of the coefficient vector and encodes each of the coefficients one by one in a single encoding pass. More details regarding the entropy encoding of the enhancement layer is described below with respect to FIG. 4.

Figure 4:
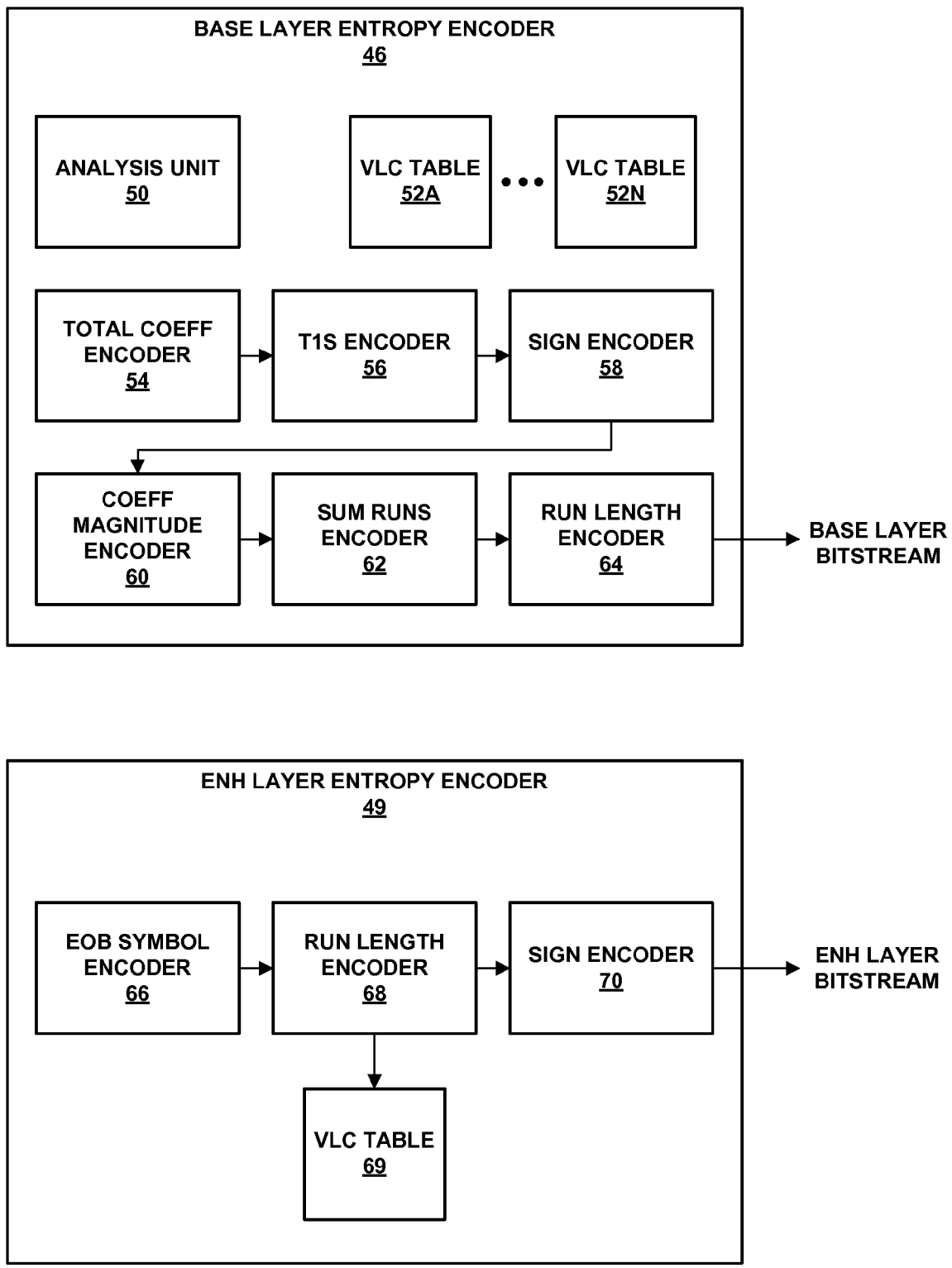
FIG. 4 is a block diagram illustrating an example base layer entropy encoder and enhancement layer entropy encoder in further detail.

FIG. 4 is a block diagram illustrating an example base layer entropy encoder 46 and enhancement layer entropy encoder 49 in further detail. Base layer entropy encoder 46 may include an analysis unit 50, a plurality of VLC tables 52A-52N ("VLC tables 52"), a total coefficient encoder 54, a trailing ones (T1s) encoder 56, a sign encoder 58, a coefficient magnitude encoder 60, a sum runs encoder 62 and a run length encoder 64. Enhancement layer entropy encoder 49 may include an EOB symbol encoder 66, a run length encoder 68, a sign encoder 70 and a VLC table 69.

Base layer entropy encoder 46 encodes a coefficient vector representing a video block at a first quality by performing multiple encoding passes. In accordance with CAVLC as defined in the H.264/MPEG-4, Part 10 AVC standard, for example, base layer entropy encoder 46 may perform a first encoding pass to analyze the coefficient vector, e.g., to generate symbols representing the coefficient vector and/or select VLC tables, and a second encoding pass to encode the coefficient vector based on the analysis.

As an example, analysis unit 50 of base layer entropy encoder 46 may analyze the coefficient vector to generate one or more symbols that represent the coefficient block. Analysis unit 50 may, e.g., in accordance with the H.264/MPEG-4, Part 10 AVC standard, determine the number of total coefficients in the block (TotalCoeff), the number of trailing one (T1s), the sign of each trailing one, a magnitude of each nonzero coefficient, a total sum of runs (sumRuns) and a run length preceding each nonzero coefficient. At least some of the symbols, e.g., TotalCoeff and sumRuns, generated by analysis unit 50 may represent all of the coefficients of the coefficient vector. Analysis unit 50 may, in other instances, generate more symbols or fewer symbols.

Additionally, or alternatively, analysis unit 50 may select, during the first or a subsequent encoding pass, a subset of VLC tables 52 for use in encoding the symbols. In one aspect, analysis unit 50 may select the subset of VLC tables 52 based on the generated symbols. Alternatively, analysis unit 50 may gather statistics during the analysis of the coefficient vector select the subset of VLC tables 52 based on the collected statistics. For example, base layer encoder 30 may select a VLC table to use when encoding the sumRuns symbol based upon the total number of coefficients in the block (TotalCoeffs) as there is some relationship between these two values. As will be described in detail below, selecting the subset of VLC tables 52 based on the generated symbols or other statistics may enable more efficient encoding of the symbols representing the coefficient vector.

Base layer entropy encoder 46 encodes the coefficient vector during a second or other subsequent coding pass. In particular, total coefficient encoder 54 encodes the total number of nonzero coefficients (TotalCoeff) in the coefficient vector. Total coefficient encoder 54 may encode TotalCoeff using one of VLC tables 52 selected based on a prediction of the number of nonzero coefficients of the current coefficient vector. In one example, the prediction of the number of nonzero coefficients of the current coefficient vector may be made based on the number of nonzero coefficients of one or more previously encoded video blocks, e.g., an upper neighboring video block and a left neighboring video block. In this manner, the base layer entropy decoder may select the same VLC table based on the previously decoded block.

After total coefficient encoder 54 encodes the total number of nonzero coefficients, T1s encoder 56 encodes the T1s symbol. T1s encoder 56 may encode the T1s symbol using one of VLC tables 52 selected based on the predicted number of nonzero coefficients, e.g., in the same manner described above with respect to total coefficient encoder 54.

Sign encoder 58 encodes signs of any trailing ones. For example, sign encoder 58 may, for each of the trailing ones, encode a '1' if the sign of the trailing one is positive and encode a '0' if the sign of the trailing one is negative. Coefficient magnitude encoder 60 encodes levels (e.g., magnitudes) of the nonzero coefficients other than the trailing ones. Coefficient magnitude encoder 60 may encode the levels of the nonzero coefficients using a VLC table, fixed length coding or other type of entropy coding.

Sum of runs encoder 62 may encodes the symbol that represents the number of zero valued coefficients that occur in the coefficient vector before the last nonzero coefficient, i.e., the sumRuns symbol. Sum of runs encoder 62 encodes the sumRuns symbol using one of VLC tables 52 selected based upon the total number of coefficients in the block (TotalCoeffs). Again, selecting the VLC table to use when encoding the sumRuns symbol based upon the total number of coefficients in the block (TotalCoeffs) may allow sum of runs encoder 62 to select a VLC table that more efficiently encodes sumRuns.

Run length encoder 64 encodes the run lengths of the coefficient vector. Run length encoder 64 may encode the run length of the last nonzero coefficient of the coefficient vector first, followed by the run length of the preceding nonzero coefficient, and so on until the run length before the first nonzero coefficient of the coefficient vector is encoded. In other words, run length encoder may begin be encoding the last run length first. Run length encoder 64 may encode each of the run lengths using VLC table 52 selected based on the sum of the total runs of the coefficient vector (sumRuns) and the sum of the runs coded so far. As an example, if a coefficient vector has a sum of runs (sumRuns) of eight, and the run encoded before the last nonzero coefficient encoded was six, then all remaining runs must be zero, one or two. Because the possible run length gets progressively shorter as each additional run is encoded, run length encoder 64 may select more efficient VLC tables to reduce the number of bits used to represent the runs. In this manner, the VLC table 52 used by run length encoder 64 may vary for each of the run lengths.

Enhancement layer entropy encoder 49 encodes the coefficient vector that represents refinements, e.g., in the form of additional coefficients or refinements to existing coefficients, to the video block in a single encoding pass to form the enhancement layer. As will be described in further detail, source device 12 may, in some instances, encode each nonzero coefficient of the coefficient vector of the enhancement layer without knowledge of any subsequent coefficients.

Enhancement layer entropy encoder 49 may start from the beginning of the coefficient vector and encode each of the coefficients one by one in a single encoding pass. In this manner, enhancement layer encoder 49 encodes the coefficient vector on a coefficient-by-coefficient basis without analyzing coefficients that occur later in the coefficient vector. Coding the enhancement layer in a single pass may eliminate the need to perform a first pass to analyze the coefficient vector and a second pass for coding the coefficient vector based on the analysis.

For each of the nonzero coefficients, EOB symbol encoder 66 encodes an EOB symbol indicating that there is at least one remaining nonzero coefficient in the coefficient vector. For example, EOB symbol encoder 66 may encode a zero when there is at least one remaining non-zero coefficient, e.g., at least the current nonzero coefficient, and encode a one when there are no more remaining nonzero coefficients.

Following encoding of the EOB symbol of each coefficient, run length encoder 68 encodes the run length preceding the nonzero coefficient. As described above, the run length represents the number of zero valued coefficients that precede the current nonzero coefficient. Run length encoder 68 may encode the run lengths using a single VLC table 69. In one instance, VLC table 69 may be the same as one of VLC tables 52 of base layer entropy encoder 46. Alternatively, run length encoder 68 may maintain a separate VLC table specifically designed to encode the runs of the coefficient vector of the enhancement layer. In any case, run length encoder 68 may not need to adaptively select the VLC table to use for encoding the runs. Instead, run length encoder 68 may use a single VLC table, thus eliminating the need for a first pass to collect statistics used to select the VLC table.

Following the encoded run length of each coefficient, sign encoder 70 encodes a sign of the nonzero coefficient. Sign encoder 70 may, for example, encode a '1' if the sign of the nonzero coefficient is positive and encode a '0' if the sign of the nonzero coefficient is negative. Enhancement layer entropy encoder 49 may not encode a magnitude of the nonzero coefficients of the enhancement layer, which may result in some loss in peak signal to noise ratio (PSNR), but reduces the number of bits used to encode the coefficients.

The entropy coding techniques of this disclosure may allow enhancement layer entropy encoder 49 to encode the coefficients of the enhancement layer bit stream in a single pass. Since enhancement layer entropy encoder 49 does not analyze the coefficient vector, e.g., to generate symbols and/or select VLC tables, only one encoding pass is needed. Conventional encoders typically perform at least two passes; (1) a first pass to analyze the coefficient vector and (2) a second pass to encode the coefficient vector based on the analysis. Additionally, enhancement layer entropy encoder 49 may encode the coefficients of the enhancement layer using a single VLC table, thus eliminating the need to perform an encoding pass to select from the various VLC tables. In this manner, enhancement layer entropy encoder 49 may reduce coding complexity, coding delay and memory requirements. Moreover, the entropy coding techniques of this disclosure may additionally result in coding the coefficients of the enhancement layer without storing and accessing coefficient information of the base layer, further reducing computational complexity and memory requirements.

Figure 5:
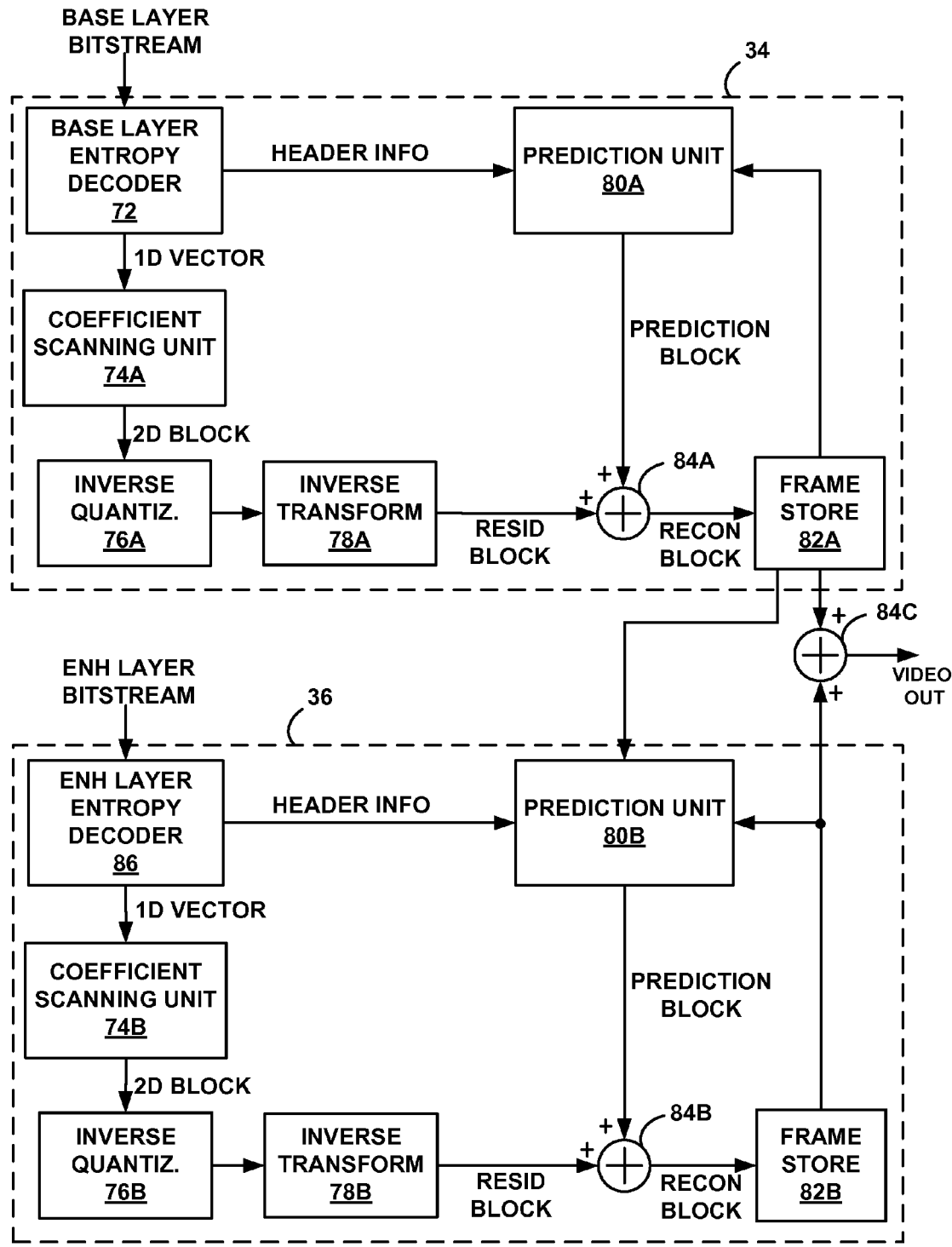
FIG. 5 is a block diagram illustrating an example of base layer decoder and enhancement layer decoder in further detail.

FIG. 5 is a block diagram illustrating an example of base layer decoder 34 and enhancement layer decoder 36 in further detail. Base layer decoder 34 includes a base layer entropy decoder 72, coefficient scanning unit 74A, inverse quantization unit 76A, inverse transform unit 78A, prediction unit 80A, frame store 82A and summer 84A. Enhancement layer decoder 34 includes an enhancement layer entropy decoder 86, coefficient scanning unit 74A, inverse quantization unit 76A, inverse transform unit 78A, prediction unit 80A, frame store 82A and summer 84A.

Base layer entropy decoder 72 decodes a received base layer bit stream to produce the video data at a first quality for presentation on display device. Base layer entropy decoder 72 receives the base layer bit stream and decodes the base layer bit stream to obtain residual information (e.g., in the form of a one-dimensional vector of quantized residual coefficients) and header information (e.g., in the form of one or more header syntax elements). Base layer entropy decoder 72 performs the reciprocal decoding function of the encoding performed by base layer entropy encoder 46 of FIGS. 3 and 4.

In particular, base layer entropy decoder 72 decodes the base layer to obtain the symbols representing the vector of the quantized residual coefficients of the base layer. When coding using CAVLC as defined in the H.264/MPEG-4, Part 10 AVC standard, for example, base layer entropy decoder 72 may decode the base layer to obtain the total number of nonzero coefficients in the block (TotalCoeff), the number of trailing ones of the block (T1s), the signs of trailing ones, the magnitudes of coefficients other than trailing ones, the sum of all runs (sumRuns), and the runs before each of the nonzero coefficient. In some instances, the VLC tables selected for decoding may be selected based on previously decoded blocks or the previously decoded symbols of the current block. In other instances, base layer entropy decoder 34 may decode the base layer bit stream to identify VLC tables to use in decoding the base layer symbols. Using the decoded symbols, base layer decoder 34 may reconstruct the coefficient vector of the base layer.

After generating the coefficient vector, coefficient scanning unit 74A reverse scans the coefficient vector to generate a two-dimensional block of quantized residual coefficients. Inverse quantization unit 76A inverse quantizes, i.e., de-quantizes, the quantized residual coefficients and inverse transform unit 78A applies an inverse transform, e.g., an inverse DCT, inverse integer transform, inverse wavelet transform or inverse directional transform, to the de-quantized residual coefficients to produce a residual block of pixel values.

Prediction unit 80A generates a prediction block using one or more adjacent blocks within a common frame in the case of intra-prediction or one or more blocks within adjacent frames in the case of inter-prediction. Prediction unit generates the prediction block using only previously encoded blocks from the base layer. Summer 84A sums the prediction block generated by prediction unit 80A with the residual block of pixel values to form a reconstructed base layer video block. The base layer video block is stored within frame store 82A for use in generating subsequent prediction blocks.

Enhancement layer decoder 36 decodes the bit stream of the enhancement layer to obtain the refinements of the video data, e.g., in the form of a vector of additional residual coefficients or refinements to existing residual coefficients. Enhancement layer entropy decoder 86 decodes, using the same VLC table used by enhancement layer entropy encoder 49, the runs and signs of the enhancement layer coefficients until an EOB symbol indicates that no more nonzero coefficients remain. Using the decoded symbols, enhancement layer entropy decoder 86 reconstructs the coefficient vector of the enhancement layer block. The decoded coefficient vector represents additional bits representing refinements, that when combined with the bits of the base layer increase the quality of the decoded video data to a second, higher quality.

After generating the coefficient vector, coefficient scanning unit 74B reverse scans the coefficient vector to generate a two-dimensional block of quantized residual coefficients. Inverse quantization unit 76B inverse quantizes, i.e., de-quantizes, the quantized residual coefficients and inverse transform unit 78B applies an inverse transform, e.g., an inverse DCT, inverse integer transform, inverse wavelet transform or inverse directional transform, to the de-quantized residual coefficients to produce a residual block of pixel values.

Prediction unit 80B generates a prediction block using one or more adjacent blocks within a common frame in the case of intra-prediction or one or more blocks within adjacent frames in the case of inter-prediction. Prediction unit generates the prediction block using previously encoded blocks from both the base layer and the enhancement layer. Summer 84B sums the prediction block generated by prediction unit 80B with the residual block of pixel values to form a reconstructed enhancement layer video block. The enhancement layer video block is stored within frame store 82B for use by prediction unit 80B in generating subsequent prediction blocks. The reconstructed base layer video block and the reconstructed enhancement layer video block are combined at summer 84C to form a video block with a higher quality.

Figure 6:
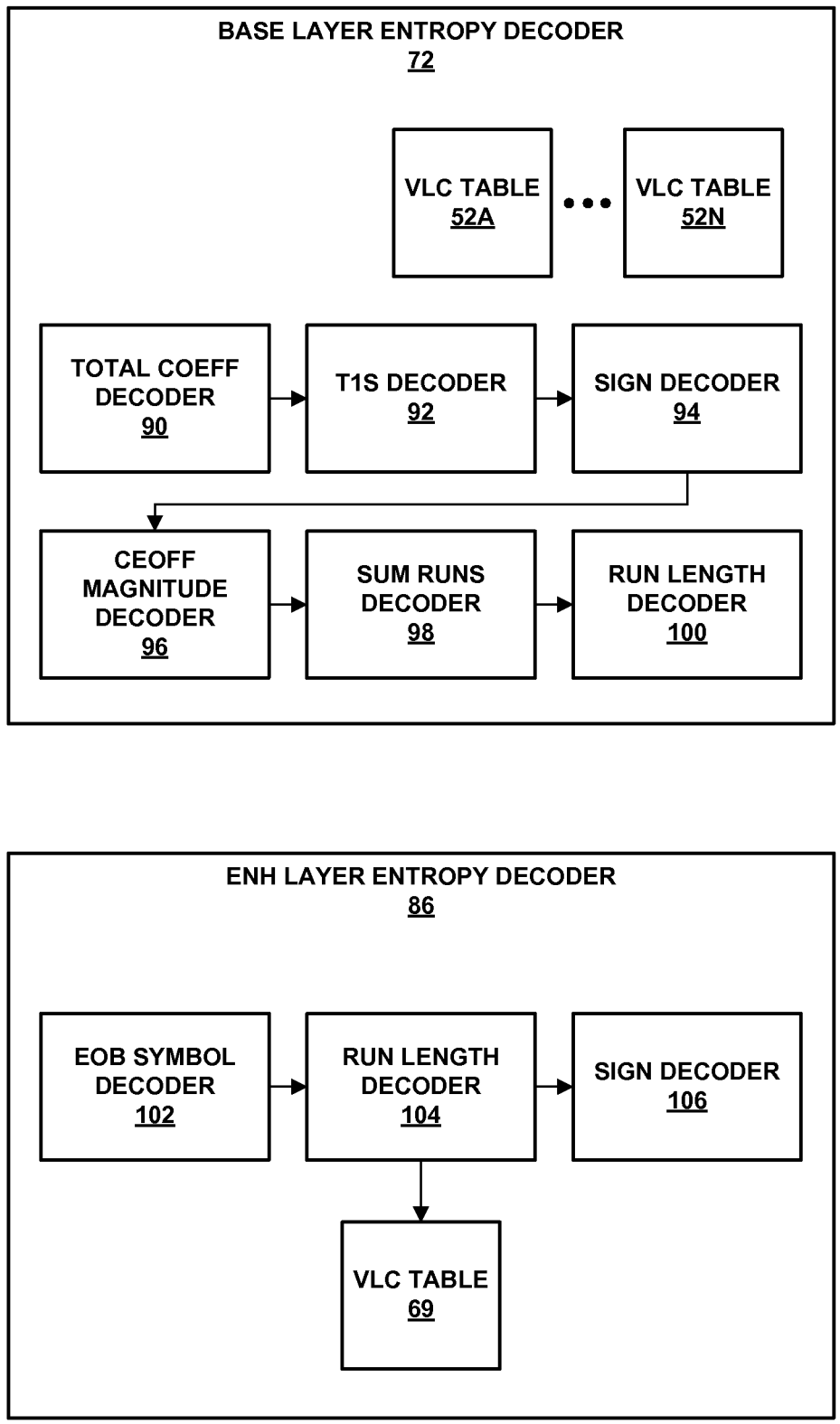
FIG. 6 is a block diagram illustrating an example base layer entropy decoder and enhancement layer entropy decoder in further detail.

FIG. 6 is a block diagram illustrating an example base layer entropy decoder 72 and enhancement layer entropy decoder 86 in further detail. Base layer entropy decoder 72 may include a plurality of VLC tables 52A-52N ("VLC tables 52"), a total coefficient decoder 90, a trailing ones (T1s) decoder 92, a sign decoder 94, a coefficient magnitude decoder 96, a sum runs decoder 98 and a run length decoder 100. Enhancement layer entropy decoder 86 may include an EOB symbol decoder 102, a run length decoder 104, a sign decoder 106 and a VLC table 69.

Base layer entropy decoder 72 decodes the base layer bit stream to obtain symbols representing the coefficient vector of the video block at a base quality level. Total coefficient decoder 90 decodes bit stream using one of VLC tables 52 to obtain the total number of nonzero coefficients (TotalCoeff) in the coefficient vector. Total coefficient decoder 90 may select the VLC table 52 for decoding TotalCoeff based on a prediction of the number of nonzero coefficients of the current coefficient vector, e.g., based on the number of nonzero coefficients of one or more previously decoded video blocks. In this manner, total coefficient decoder 90 may select the same VLC table 52 used by total coefficient encoder 54 to encode the TotalCoeff symbol.

After total coefficient decoder 90 decodes the total number of nonzero coefficients, T1s decoder 92 decodes the T1s symbol. The T1s symbol represents the number of coefficients with a magnitude of one that are encountered before a coefficient with a magnitude greater than one is encountered when the coefficient vector is read in reverse order. T1s decoder 92 may decode the T1s symbol using one of VLC tables 52 selected based on the predicted number of nonzero coefficients.

Sign decoder 94 decodes signs of any trailing ones. For example, sign decoder 94 may, for each of the trailing ones, determine that the sign of the coefficient is positive when a '1' is received and determine that the sign of the coefficient is negative when a '0' is received. Coefficient magnitude decoder 96 decodes magnitudes of the nonzero coefficients other than the trailing ones. Coefficient magnitude decoder 96 may decode the levels of the nonzero coefficients using a VLC table, fixed length coding or other type of entropy coding.

Sum of runs decoder 98 may decode the symbol that represents the number of zero valued coefficients that occur in the coefficient vector before the last nonzero coefficient, i.e., the sumRuns symbol. Sum of runs decoder 98 decodes the sumRuns symbol using one of VLC tables 52 selected based upon the total number of coefficients in the block (TotalCoeffs), which was decoded previously by total coefficient decoder 90. Again, selecting the VLC table to use when decoding the sumRuns symbol based upon the total number of coefficients in the block (TotalCoeffs) may allow sum of runs decoder 98 to select a VLC table that more efficiently decodes sumRuns.

Run length decoder 100 decodes the run lengths of the coefficient vector. Run length decoder 100 may decode the run length of the last nonzero coefficient of the coefficient vector first, followed by the run length of the preceding nonzero coefficient, and so on until the run length before the first nonzero coefficient of the coefficient vector is decoded. In other words, run length decoder 100 may begin be decoding the last run length first. Run length decoder 64 may decode each of the run lengths using a VLC table 52 selected based on the sum of the total runs of the coefficient vector (sumRuns) and the sum of the runs coded so far. The sumRuns symbol was previously decoded by sum of runs decoder 98. Run length decoder 100 may, however, collect statistics regarding the sum of the runs decoded so far. Because the possible run length gets progressively shorter as each additional run is decoded, run length decoder 100 may select more efficient VLC tables to reduce the number of bits used to represent the runs. In this manner, the VLC table 52 used by run length decoder 100 may vary for each of the run lengths.

Enhancement layer entropy decoder 86 decodes the bit stream of the enhancement layer to obtain refinements for the video block, e.g., in the form of additional coefficients or refinements to existing coefficients. EOB symbol decoder 102 determines whether an EOB symbol indicates whether there is at least one remaining nonzero coefficient. When there is at least one remaining nonzero coefficient, run length decoder 104 decodes a run length preceding the next nonzero coefficient. Run length decoder 104 may decode the run length of the next nonzero coefficient using VLC table 69, which is the same VLC table used by run length encoder 68. Sign encoder 106 decodes a sign of the nonzero coefficient. For example, sign encoder 106 may determine the sign of the coefficient to be positive when a '1' is received and negative when a '0' is received. Enhancement layer entropy decoder 86 continues to decode the nonzero coefficients until EOB symbol decoder 102 indicates there are no remaining nonzero coefficients.

Figures 7, 8:
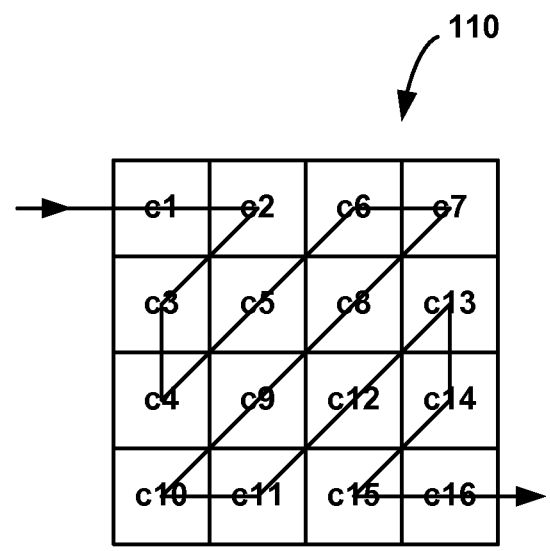
FIG. 7 is a conceptual diagram illustrating zigzag scanning of a 4×4 coefficient block.
FIG. 8 is a conceptual diagram illustrating a hypothetical example of a block of coefficients of an enhancement layer video block.

FIG. 7 is a conceptual diagram illustrating zigzag scanning of a 4×4 coefficient block 40. The zigzag scanning shown in FIG. 7 may be performed by encoders 30, 32 of FIG. 2. The scanning order for such zigzag scanning shown in FIG. 7 follows the arrow through video blocks 110, and the coefficients c1-c16 are labeled in the scanning order. In particular, the numerical values shown in FIG. 7 indicate positions of the coefficients within a sequential one-dimensional vector, and do not represent actual values of the coefficients. The result of the zigzag scanning illustrated in FIG. 7 is a one-dimensional coefficient vector X, where $$X=[c1, c2, c3, c4, c5, c6, c7, c8, c9, c10, c11, c12, c13, c14, c15, c6]$$

where c1-c16 represent coefficient positions within the two-dimensional array of coefficients.

The techniques of this disclosure are not limited to any particular scanning order or technique. For example, the scanning order used in this disclosure may be the zigzag scanning order shown in FIG. 7. Alternatively, the scanning orders used in this disclosure may be other scanning orders, such as horizontal scanning, vertical scanning, or any other scanning technique.

FIG. 8 is a conceptual diagram illustrating a hypothetical example of a coefficient block 120 of coefficients of an enhancement layer. In this example, the numerical values shown in FIG. 8 indicate actual values of the coefficients at the positions. The actual coefficient values of coefficient block 120 may represent quantized residual coefficients, transform coefficients without quantization, or other type of coefficients of the video block in the enhancement layer. In the example illustrated in FIG. 8, coefficient block 120 is a 4×4 block. However, the techniques of this disclosure may be extended to apply to blocks of any size. After scanning coefficient block 120 in accordance with the zigzag scanning illustrated in FIG. 3, the resulting coefficient vector V is:

V=[4, 0, 0, −2, 0, 1, 0, 0, 0, 0, 0, 0, 0, 0, 0, 0].

Enhancement layer encoder 32 encodes each of the coefficients of coefficient vector V in accordance with the techniques described in this disclosure. As an example, for each of the nonzero coefficients of coefficient vector V, enhancement layer encoder 32 encodes an EOB symbol, a run length and a sign. As described in detail above, the EOB symbol indicates whether there are any remaining nonzero coefficients in the coefficient vector, the run length represents the number of zero valued coefficients that occur before the current nonzero coefficient of the coefficient vector, and the sign indicates whether the coefficient value is positive or negative.

In accordance with one aspect of this disclosure, enhancement layer encoder 32 may not encode a magnitude of the coefficients. Instead, enhancement layer encoder 32 may encode each of the nonzero coefficients as if the magnitude of all of the nonzero coefficients was equal to one. In this manner, enhancement layer encoder 32 may be viewed as encoding the following coefficient vector V' instead of V.

V'=[1, 0, 0, −1, 0, 1, 0, 0, 0, 0, 0, 0, 0, 0, 0, 0]

Enhancement layer encoder 32 may, for example, encode the first coefficient (i.e., 4 in coefficient vector V or 1 in coefficient vector V') using an EOB equal to zero, a codeword for a run of zero, and a sign equal to one, encode the second coefficient (i.e., −2 in coefficient vector V or −1 in coefficient vector V') using an EOB equal to zero, a codeword for a run of two, and a sign equal to zero, and encode the third nonzero coefficient (i.e., 1 in coefficient vector V or coefficient vector V') with an EOB equal to zero, a codeword for a run of one and a sign equal to one, followed by an EOB symbol equal to one. As described above, the codewords used to encode the runs may be obtained from a VLC table defined in the H.264/MPEG-4 Part 10 AVC standard.

The example encoded bit stream is described for purposes of illustration. Enhancement layer encoder 32 may encode the coefficient vector V, V' in different manners without departing from the scope of this disclosure. For example, the EOB symbol may be encoded as a one to represent additional nonzero coefficients in the block and as a zero to represent no remaining nonzero coefficients. Likewise, the sign symbol may be encoded as a zero to represent a positive nonzero coefficient and as a one to represent a negative nonzero coefficient. As another example, the EOB symbol encoded for each nonzero coefficient may represent whether the current coefficient is the last nonzero coefficient of the vector. As such, there may be no EOB symbol at the end of the encoded bit stream. Instead, when the EOB symbol indicates that the current coefficient is the last nonzero coefficient, the video decoder knows that after decoding the run and symbol of the current coefficient there are no additional coefficients of the block.

Figure 9:
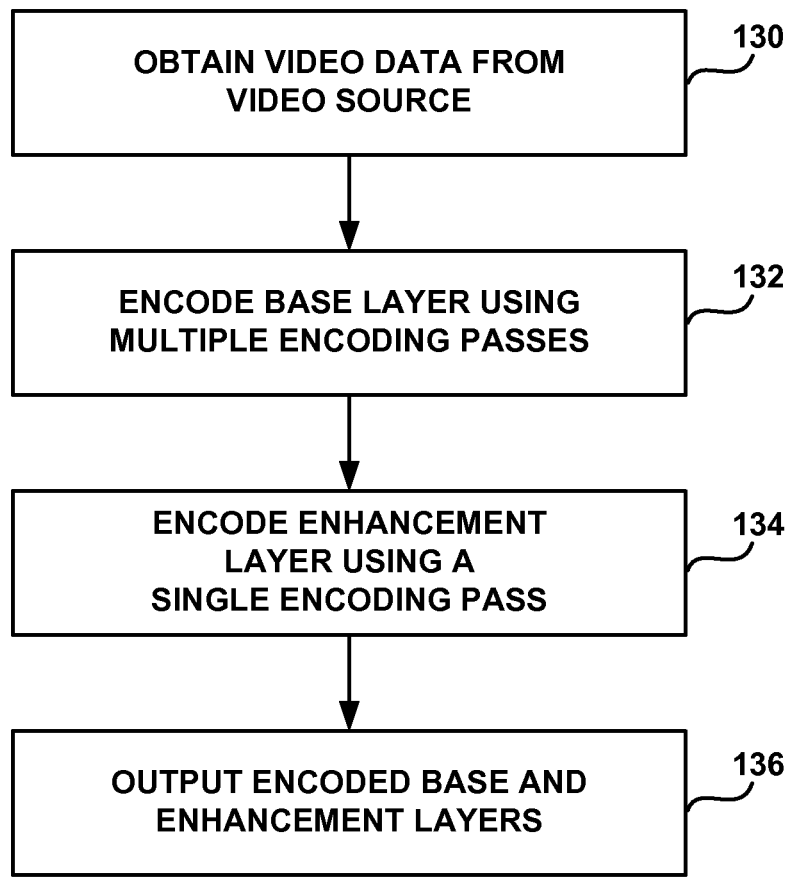
FIG. 9 is a flow diagram illustrating an example operation of a video encoder performing the scalable video coding techniques of this disclosure.

FIG. 9 is a flow diagram illustrating an example operation of video encoder, such as video encoder 20 of FIG. 2, performing the scalable video coding techniques of this disclosure. Base layer encoder 30 and enhancement layer encoder 32 of video encoder 20 obtain video data from video source 18 (130). As described above, base layer encoder 30 and enhancement layer encoder 32 obtain the same original video data. The video data obtained from video source 18 may, for example, be a series of video frames.

For each video block, base layer encoder 30 encodes a base layer using a coding technique that performs multiple encoding passes (132). The base layer encodes the video block at a first quality level. Base layer encoder 30 may generate a coefficient vector that represents the video block at the first quality and encoder the residual transform coefficients of the block to generate the base layer. Base layer encoder 30 may encode the coefficient vector to generate the base layer in accordance with CAVLC as defined in the H.264/MPEG-4, Part 10 AVC standard. As described in detail above with respect to FIG. 2, base layer encoder 30 may perform a first encoding pass to analyze the coefficient vector and a second pass to encode the coefficient vector based on the analysis.

For each video block, enhancement layer encoder 32 encodes additional bits as an enhancement layer using a coding technique that performs a single encoding pass (134). The additional bits of the enhancement layer bit stream encode refinements that, when added to the base layer bit stream, enhance the video to a second, higher quality level. Although enhancement layer encoder 32 is described as encoding only a single enhancement layer in this example, enhancement layer encoder 32 may encode more than one enhancement layer bit stream. In the case, the enhancement layers may be hierarchical in the sense that the enhancement layers offer progressively higher quality as they are decoded.

The second entropy coding technique used by enhancement layer encoder 32 may encode, for each of the nonzero coefficients of coefficient vector of the enhancement layer, an EOB symbol, a run and a sign. As described in detail above, the EOB symbol may indicate whether there are any remaining nonzero coefficients, the run length represents the number of zero valued coefficients that occur preceding the nonzero coefficient, and the sign indicates whether the coefficient value is positive or negative. Following the sign of the last nonzero coefficient, enhancement layer encoder 32 may encode the EOB symbol to indicate that there are no remaining nonzero coefficients.

Base layer encoder 30 and enhancement layer encoder 32 output the encoded base layer and enhancement layer bit streams, respectively (136). The entropy coding technique used by enhancement layer encoder 32 may allow encoding of the residual coefficients of the enhancement layer with lower computational and implementation complexity without much loss of coding efficiency. The entropy coding techniques of this disclosure may enable the coding of additional video data, e.g., in the form of refinements, in the enhancement layer bit stream in a single encoding pass, thereby reducing coding complexity, coding delay and memory requirements. For instance, enhancement layer encoder 32 may encode each nonzero coefficient of a coefficient vector of the enhancement layer without knowledge of any subsequent coefficients, thus allowing coding of the coefficient vector in a single pass and eliminating the need to perform a first pass to analyze the coefficient vector and a second pass for coding the coefficient vector based on the analysis.

Figure 10:
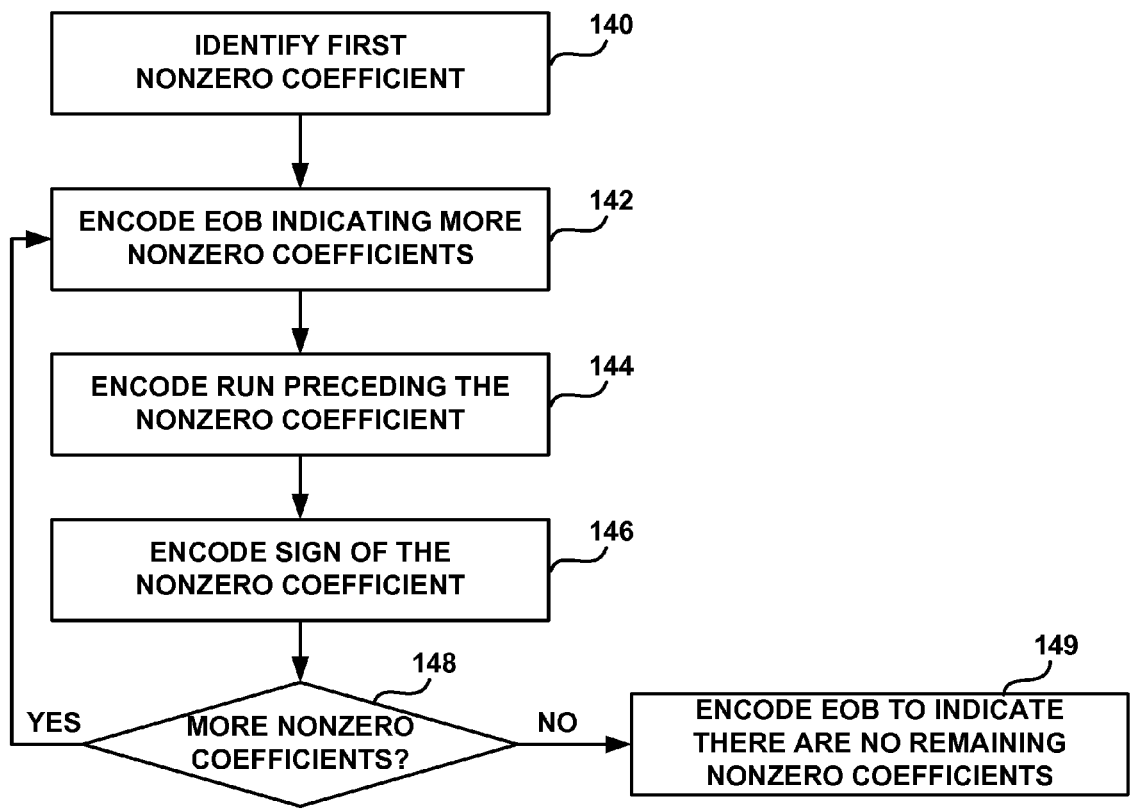
FIG. 10 is a flow diagram illustrating an example operation of an enhancement layer encoder encoding residual coefficients of an enhancement layer video block in accordance with one aspect of this disclosure.

FIG. 10 is a flow diagram illustrating an example operation of an enhancement layer encoder, such as enhancement layer encoder 32 of FIG. 2, encoding residual coefficients of a video block of the enhancement layer in accordance with one aspect of this disclosure. Enhancement layer encoder 32 identifies a first nonzero coefficient in the coefficient vector of the enhancement layer block (140). Enhancement layer encoder 32 encodes an EOB symbol indicating that there is at least one remaining nonzero coefficient in the coefficient vector of the enhancement layer block (142). Enhancement layer encoder 32 may encode the EOB symbol using a single bit, e.g., encode a zero when there is at least one remaining non-zero coefficient and encode a one when there are no more remaining nonzero coefficients.

Enhancement layer encoder 32 encodes a run that indicates the number of zero valued coefficients that precede the nonzero coefficient (144). Enhancement layer encoder 32 may, in some instances, encode the run using a VLC table that is already stored for CAVLC as defined in the H.264/MPEG-4, Part 10, AVC standard. For example, enhancement layer encoder 32 may encode the run using the VLC table used to code total sum of runs (sumRuns) when the total number of coefficients (TotalCoeffs) is equal to one. Alternatively, enhancement layer encoder 32 may maintain a separate VLC table specifically designed to encode the runs of the coefficient vector of the enhancement layer.

Enhancement layer encoder 32 may encode a sign of the nonzero coefficient (146). Enhancement layer encoder 32 may, for example, encode a '1' if the sign of the nonzero coefficient is positive and encode a '0' if the sign of the nonzero coefficient is negative. In some instances, enhancement layer encoder 32 may not encode a magnitude of the nonzero coefficients. In this manner, enhancement layer encoder 32 may limit the magnitude of the nonzero coefficients to be one. As such, any nonzero coefficient with a magnitude greater than one is set equal to one. Not encoding the magnitudes of the nonzero coefficients of the enhancement layer may result in some loss in peak signal to noise ratio (PSNR), but reduces the number of bits used to encode the nonzero coefficients.

Enhancement layer encoder 32 determines whether there are any remaining nonzero coefficients in the enhancement layer block (148). When there is at least one remaining nonzero coefficient in the enhancement layer block, enhancement layer encoder 32 continues to encode an EOB, run and sign for each of the remaining nonzero coefficients. When there are no remaining nonzero coefficients in the enhancement layer block, enhancement layer encoder 32 encodes the EOB symbol to indicate that there are no remaining nonzero coefficients in the coefficient vector of the enhancement layer block (149). As described above, the enhancement layer is transmitted along with the base layer.

Because the enhancement layer coding technique described in FIG. 10 does not code symbols that refer to more than one coefficient, the enhancement layer coding technique may allow enhancement layer encoder 32 to discard one or more of the quantized residual coefficients of the coefficient vector during encoding depending on the available bit rate. Moreover, the enhancement layer coding technique reduces coding complexity and implementation.

Figure 11:
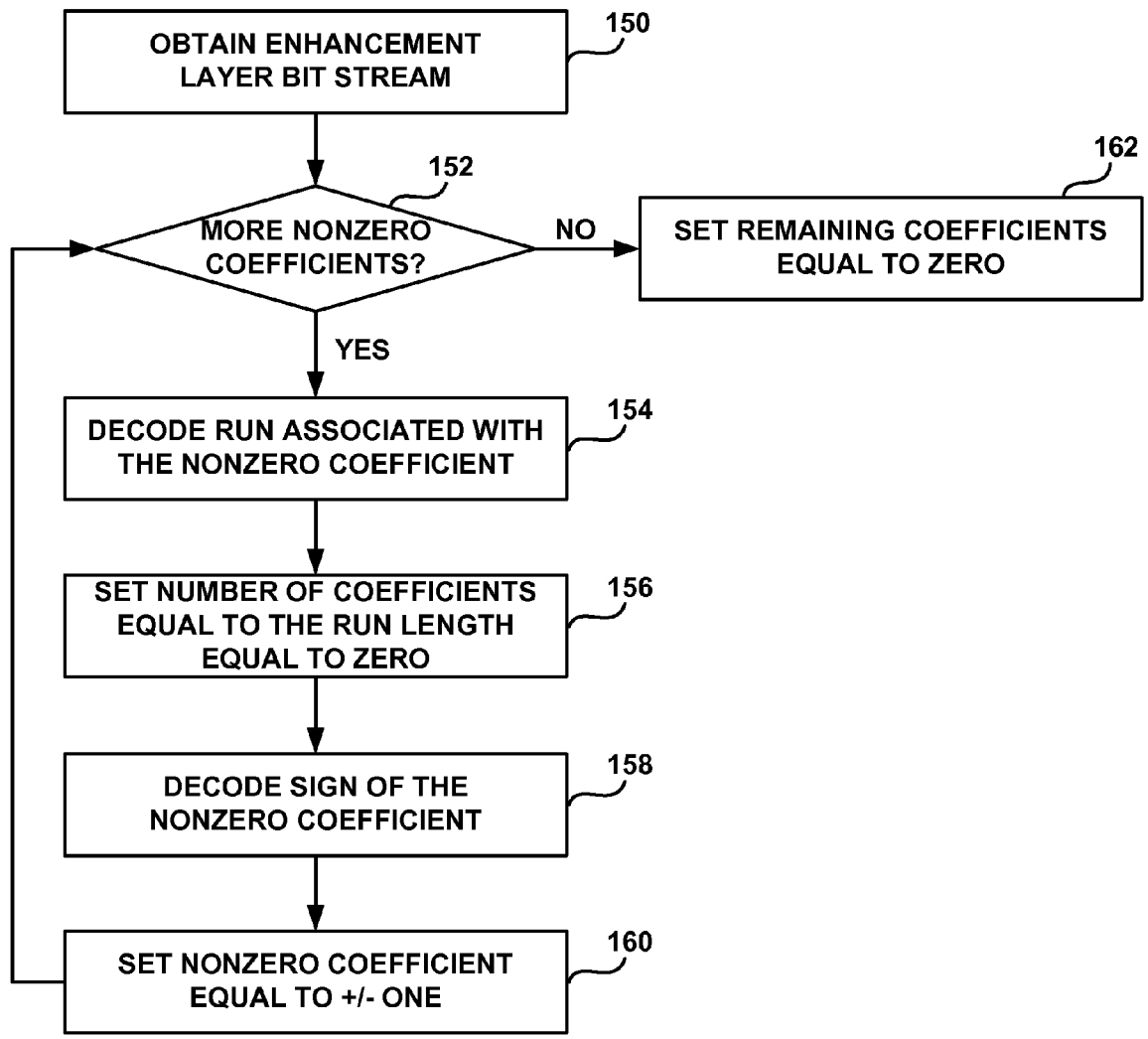
FIG. 11 is a flow diagram illustrating example operation of an enhancement layer decoder decoding an enhancement layer bit stream to obtain a vector of residual transform coefficients.

FIG. 11 is a flow diagram illustrating example operation of an enhancement layer decoder, such as enhancement layer decoder 36 of FIG. 2, decoding an enhancement layer bit stream to obtain a vector of residual transform coefficients. Enhancement layer decoder 36 obtains the enhancement layer bit stream (150). Enhancement layer decoder 36 analyzes an EOB symbol to determine whether there are any remaining nonzero coefficients (152). Enhancement layer decoder 36 may, for example, determine that there is at least one remaining nonzero coefficient when the EOB symbol is equal to zero and determine that there are no remaining nonzero coefficients when the EOB symbol is equal to one.

When enhancement layer decoder 36 determines that there is at least one remaining nonzero coefficient, e.g., EOB symbol is equal to zero, enhancement layer decoder 36 decodes a run associated with the next nonzero coefficient (154). The run associated with the next nonzero coefficient represents the number of zero valued coefficients preceding the nonzero coefficient. Enhancement layer decoder 36 decodes the run using the same VLC table used by enhancement layer encoder 32. In one instance, enhancement layer decoder 36 may decode the run using the VLC table used in CAVLC as defined in the H.264/MPEG-4, Part 10, AVC standard for use in coding the total sum of runs (sumRuns) when the total number of coefficients (TotalCoeffs) is equal to one. Other VLC tables may, however, be used as long as it is the same table used by the enhancement layer encoder 32. Enhancement layer decoder 36 sets a number of coefficients equal to the run length preceding the nonzero coefficient equal to zero (156). If the run length is equal to two, for example, enhancement layer decoder 36 may set two coefficients preceding the nonzero coefficient equal to zero.

Enhancement layer decoder 36 decodes the sign of the nonzero coefficient (158). The sign of the nonzero coefficient may be decoded as a positive when the sign symbol is equal to one and as a negative when the sign symbol is equal to zero. After decoding the sign of the nonzero coefficient, enhancement layer decoder 36 may set the nonzero coefficient equal to plus or minus one based on the decoded sign (160). As described above, the enhancement layer may not encode the magnitude of the coefficients of the enhancement layer. As such, enhancement layer decoder 36 may be configured to se the magnitude of all nonzero coefficients equal to one.

Enhancement layer decoder 36 continues to decode runs and signs of nonzero coefficient until enhancement layer decoder 36 determines that there are no remaining nonzero coefficients, e.g., EOB symbol is equal to one. At this point, enhancement layer decoder 36 sets the remaining coefficients of the vector, if any coefficients remain, equal to zero (162). As described in detail with respect to FIG. 2, enhancement layer decoder 36 uses the coefficient vector in addition to a prediction block and other data to reconstruct the video block for presentation to display 28.

FIGS. 12-15 are block diagrams illustrating different configurations of encoders and/or decoders for use in scalable video coding. These example encoders and decoders are for purposes of illustration of the types of encoders within which the techniques of this disclosure may be utilized. The example configurations, however, should in no way be limiting of the techniques as described. The techniques may be used in any scalable video encoder.

Each of the example video encoders and decoders illustrated in FIGS. 12-15 may utilize the entropy coding techniques described in this disclosure to promote efficient coding of enhancement layer bit streams. The entropy coding techniques of this disclosure may enable the coding of additional video data, e.g., in the form of refinements, in the enhancement layer bit stream in a single encoding pass, thereby reducing coding complexity, coding delay and memory requirements. As will be described in further detail, each nonzero coefficient of a coefficient vector of the enhancement layer may be encoded without knowledge of any subsequent coefficients, i.e., any coefficients following the nonzero coefficient currently being coded. Coding the enhancement layer in a single pass may eliminate the need to perform a first pass to analyze the coefficient vector and a second pass for coding the coefficient vector based on the analysis.

Figure 12:
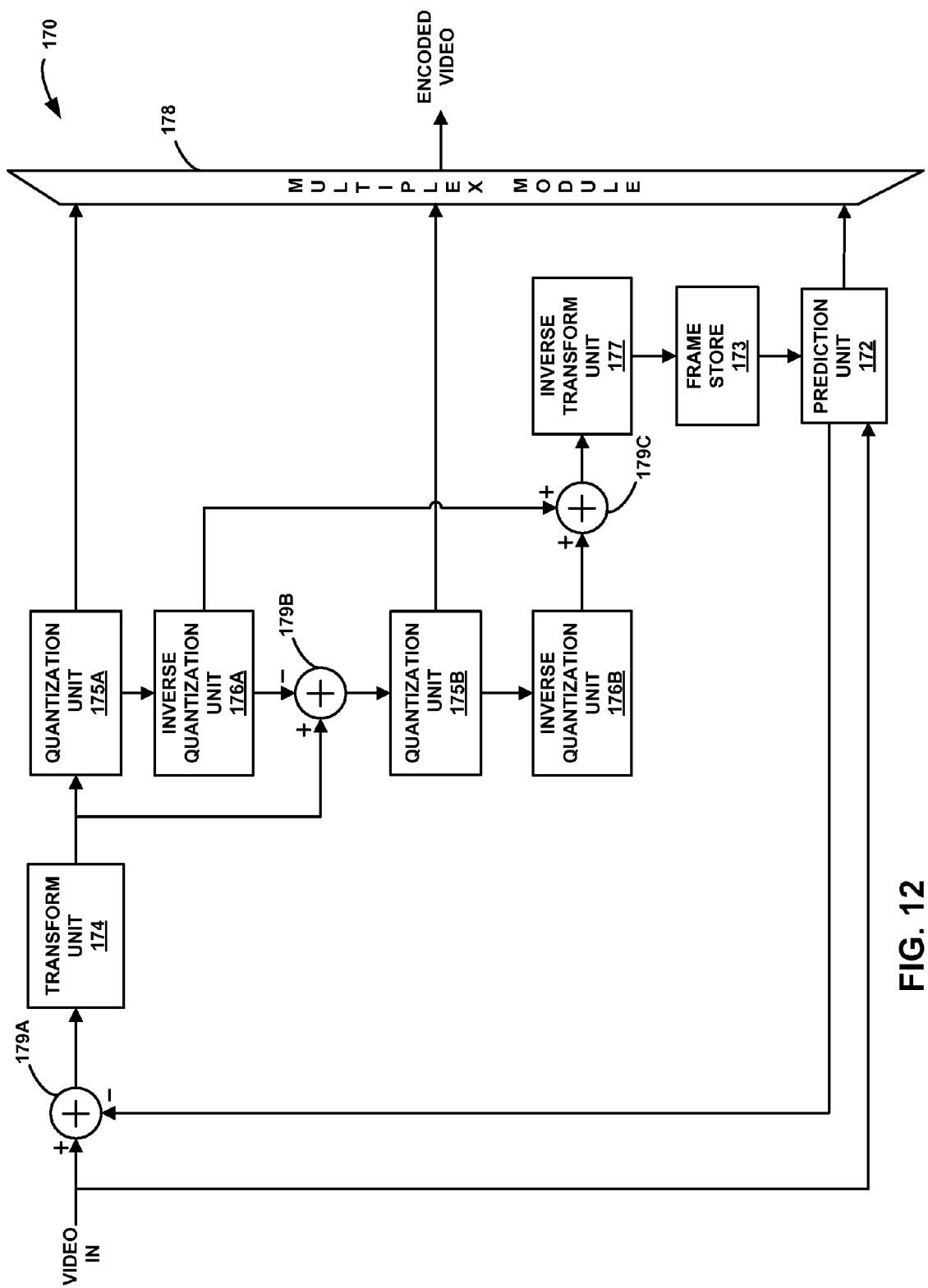
FIGS. 12-15 are block diagrams illustrating different configurations of encoders and/or decoders for use in scalable video coding in accordance with this disclosure.

FIG. 12 is a block diagram illustrating an example scalable video encoder 170. Scalable video encoder 170 may, for example, correspond with video encoder 20 of FIG. 2. In the example of FIG. 12, scalable video encoder 170 includes a base layer encoder 30 includes a prediction unit 172, frame store 173, transform unit 174, quantization units 175A and 175B, inverse quantization units 176A and 176B, inverse transform unit 177, multiplex module 178 and summers 179A-179C. Depiction of different features in FIG. 3 as units is intended to highlight different functional aspects of the devices illustrated and does not necessarily imply that such units must be realized by separate hardware or software components. Rather, functionality associated with one or more units may be integrated within common or separate hardware or software components.

Prediction unit 172 generates a prediction block using intra- or inter-prediction. The prediction block may be a predicted version of the current video block being coded. As described above, prediction unit 172 may generate the prediction block using intra-prediction based on one or more previously encoded blocks of the base layer within the same frame as the block currently being coded. Alternatively, prediction unit may generate the prediction block using inter-prediction based on one or more previously encoded blocks within one or more adjacent frames of the base layer. Prediction unit 172 may retrieve the previously encoded block from frame store 173.

Following intra- or inter-based prediction of the video blocks, base layer encoder 30 generates a residual block by subtracting the prediction block produced by prediction unit 172 from the current video block at summer 179A. The residual block includes a set of pixel difference values that quantify differences between pixel values of the current video block and pixel values of the prediction block. The residual block may be represented in a two-dimensional block format (e.g., a two-dimensional matrix or array of pixel values). In other words, the residual block is a two-dimensional representation of the pixel values.

Transform unit 174 applies a transform to the residual block to produce residual transform coefficients. Transform unit 174 may, for example, apply a DCT, an integer transform, directional transform, wavelet transform, or a combination thereof. After applying the transform to the residual block of pixel values, quantization unit 175A quantizes the transform coefficients to further reduce the bit rate. The output of quantization unit 175A, which corresponds to the quantized coefficients associated with a base layer, is provided to multiplex module 178.

Following quantization, inverse quantization unit 176A applies inverse quantization to generate a reconstructed version of the residual block of transform coefficients. Summer 179B subtracts the reconstructed version of the residual block of transform coefficients output from inverse quantization unit 176A from the original residual block of transform coefficients output by transform unit 174. This block, which is referred to herein as the transform difference block, is provided to quantization unit 175B. Quantization unit 175B quantizes the transform coefficients to further reduce the bit rate. The output of quantization unit 175B, which corresponds to the quantized coefficients associated with an enhancement layer, is provided to multiplex module 178. In one example, quantization unit 175A may quantize the residual coefficients using a first QP and quantization unit 175B may quantize the residual coefficient differences using a second QP. The second QP may, for instance be half the value of the first QP, i.e., QP/2.

Following quantization by quantization unit 175B, inverse quantization unit 176B applies inverse quantization to generate a reconstructed version of the transform difference block. Summer 179C adds the reconstructed version of the residual block of transform coefficients output from inverse quantization unit 176A with the reconstructed version of the transform difference block output by inverse quantization unit 176B to generate a reconstructed residual block.

Inverse transform unit 177 applies inverse transformation to reconstructed version of the video block. The reconstructed version of the video block stored in frame store 173 and may be used by prediction unit 172 to intra- or inter-code a subsequent video block. Prediction unit 172 may provide control data, such as motion vectors, partition sizes, intra coding modes, or the like, to multiplex module 178. Multiplex module 178 may combine the base and enhancement layer data. In some instances, multiplex module 178 may include entropy encoders for entropy encoding the base and enhancement layer data. In other instances the base and enhancement layer encoders may be separate from the multiplex module.

Figure 13:
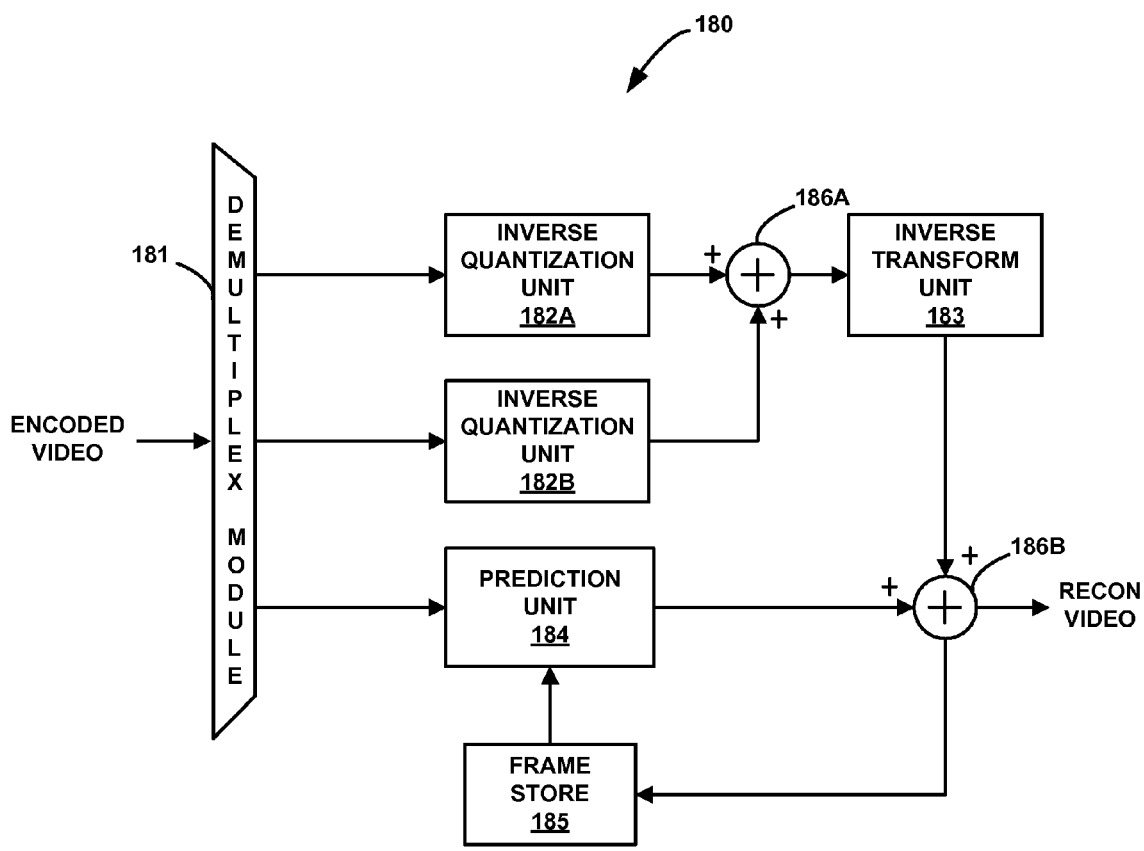

FIG. 13 is a block diagram illustrating an example scalable video decoder 180. Scalable video decoder 180 may, for example, correspond with video decoder 26 of FIG. 2. Scalable video decoder 180 of FIG. 13 a demultiplex module 181, inverse quantization units 182A and 182B, inverse transform unit 183, prediction unit 184, frame store 185 and summers 186A and 186B.

Demultiplex module 181 receives the scalable encoded video and demultipexes the signals. In some instances, demultiplex module 181 may include entropy decoders for entropy decoding the base and enhancement layer data. In other instances the base and enhancement layer decoders may be separate from the demultiplex module.

Inverse quantization unit 182A inverse quantizes, i.e., de-quantizes, the quantized residual coefficients associated with the base layer and inverse quantization unit 182B de-quantizes the quantized residual coefficients associated with the enhancement layer. In one example, inverse quantization unit 182A may quantize the residual coefficients using a first QP and inverse quantization unit 182B may quantize the residual coefficient differences using a second QP. The second QP may, for instance, be half the value of the first QP, i.e., QP/2. The respective sets of de-quantized transform coefficients output by inverse quantization units 182A and 182B are added at summer 186A to generate a reconstructed residual transform block. As described above, the de-quantized transform coefficients output by inverse quantization unit 182A may correspond with a base level of quality and the de-quantized transform coefficients output by inverse quantization unit 182B, when added to the output of inverse quantization unit 182B result in an increased level of quality.

Inverse transform unit 183 applies an inverse transform, e.g., an inverse DCT, inverse integer transform, inverse wavelet transform or inverse directional transform, to the sum of the de-quantized residual coefficient blocks to produce a residual block of pixel values. Summer 186B adds a prediction block generated by prediction unit 184 with the residual block of pixel values to form a reconstructed base layer video block. As described in detail above, prediction unit 184 may generate the prediction block using one or more adjacent blocks within a common frame in the case of intra-prediction or one or more blocks within adjacent frames in the case of inter-prediction, which may be stored within frame store 185.

Figure 14:
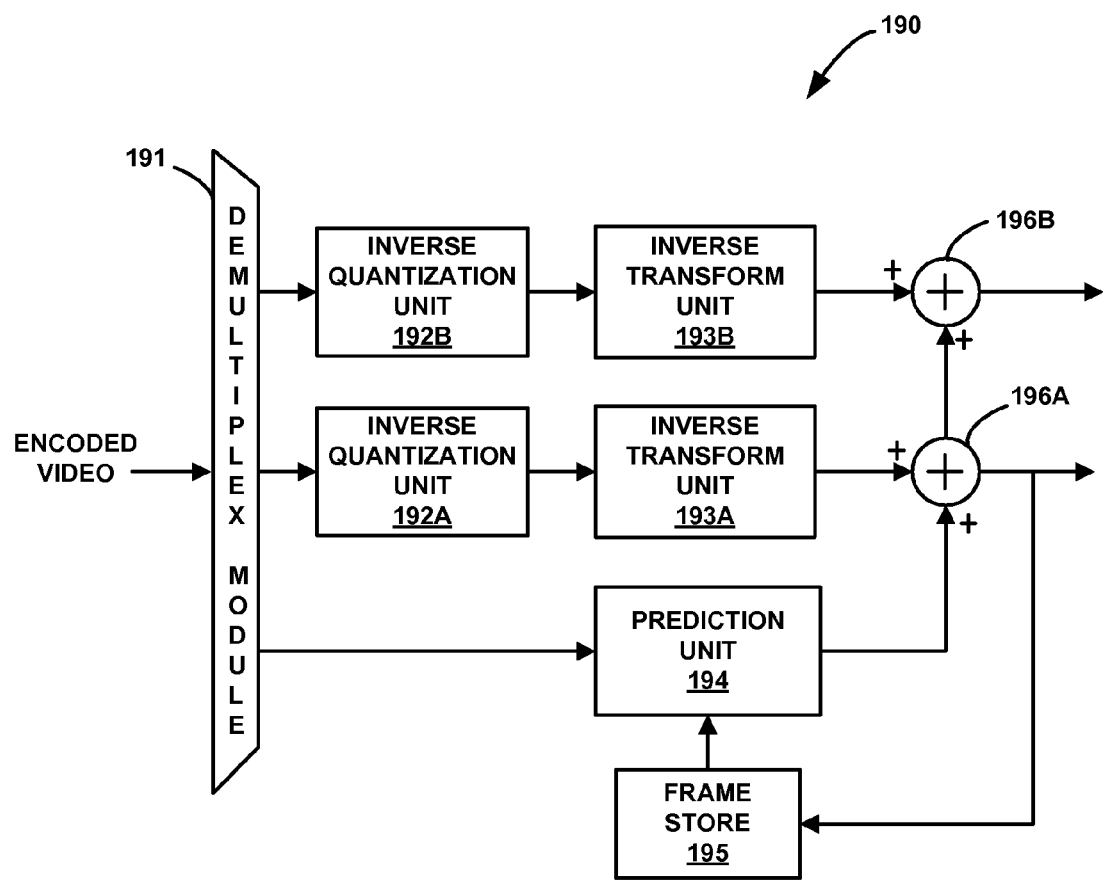

FIG. 14 is a block diagram illustrating another example scalable video decoder 190. Scalable video decoder 190 may, for example, correspond with video decoder 26 of FIG. 2. Scalable video decoder 190 of FIG. 14 a demultiplex module 191, inverse quantization units 192A and 192B, inverse transform units 193A and 193B, prediction unit 194, frame store 195 and summers 196A and 196B.

Demultiplex module 191 receives the scalable encoded video and demultipexes the signals. In some instances, demultiplex module 181 may include entropy decoders for entropy decoding the base and enhancement layer data. In other instances the base and enhancement layer decoders may be separate from the demultiplex module.

Inverse quantization unit 192A and inverse transform unit 193A apply inverse quantization, i.e., de-quantization, and inverse transformation operations on the decoded residual coefficients associated with the base layer to obtain a reconstructed version of a residual block of the base layer. Inverse quantization unit 192B and inverse transform unit 193B apply inverse quantization, i.e., de-quantization, and inverse transformation operations on the decoded residual coefficients associated with the enhancement layer to obtain a reconstructed version of a residual block of the enhancement layer. In one example, inverse quantization unit 192A may quantize the residual coefficients using a first QP and inverse quantization unit 192B may quantize the residual coefficient differences using a second QP. The second QP may, for instance, be half the value of the first QP, i.e., QP/2.

Prediction unit 194 may generate the prediction block using one or more adjacent blocks within a common frame in the case of intra-prediction or one or more blocks within adjacent frames in the case of inter-prediction, which may be stored within frame store 195. Summer 196A adds the prediction block generated by prediction unit 194 to the reconstructed residual block output from inverse transform unit 193A to generate decoded video data at a base level of quality. The decoded video data having a base level of quality is output from scalable video encoder 190.

The decoded video data having a base level of quality is also provided to summer 196B. Summer 196B adds the output of summer 196A with the reconstructed version of the residual block of the enhancement layer output from inverse transform unit 193B to generate decoded video data at a second, higher level of quality. The decoded video data having a base level of quality is output from scalable video encoder 190.

Figure 15:
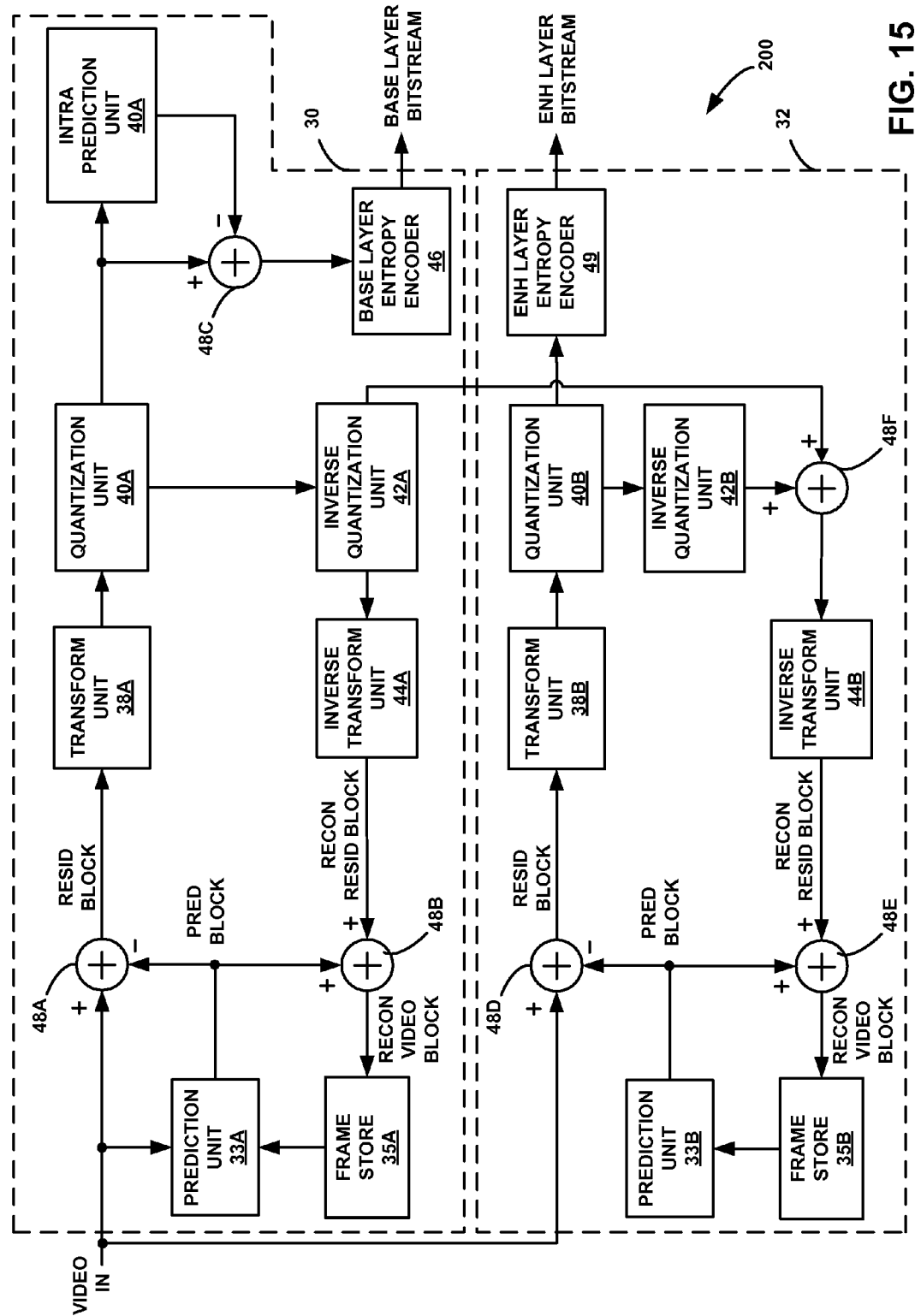

FIG. 15 is a block diagram illustrating another example video encoder 200. In the example of FIG. 15, base layer encoder 30 includes a prediction unit 33A, frame store 35A, transform unit 38A, quantization unit 40A, coefficient scanning unit 41A, inverse quantization unit 42A, inverse transform unit 44A, base layer entropy encoder 46 summers 48A-48C, and intra prediction unit 40A. Depiction of different features in FIG. 3 as units is intended to highlight different functional aspects of the devices illustrated and does not necessarily imply that such units must be realized by separate hardware or software components. Rather, functionality associated with one or more units may be integrated within common or separate hardware or software components.

Prediction unit 33A generates a prediction block using inter-prediction, e.g., motion compensated prediction. The prediction block may be a predicted version of the current video block being coded. As described above, prediction unit 33A may generate the prediction block using inter-prediction based on one or more previously encoded blocks within one or more adjacent frames of the base layer. Prediction unit 33A may retrieve the previously encoded block from frame store 35A.

Following inter-based prediction of the video blocks, base layer encoder 30 generates a residual block by subtracting the prediction block produced by prediction unit 33A from the current video block at summer 48A. The residual block includes a set of pixel difference values that quantify differences between pixel values of the current video block and pixel values of the prediction block. The residual block may be represented in a two-dimensional block format (e.g., a two-dimensional matrix or array of pixel values). In other words, the residual block is a two-dimensional representation of the pixel values.

Transform unit 38A applies a transform to the residual block to produce residual transform coefficients. Transform unit 38A may, for example, apply a DCT, an integer transform, directional transform, wavelet transform, or a combination thereof. After applying the transform to the residual block of pixel values, quantization unit 40A quantizes the transform coefficients to further reduce the bit rate. Following quantization, inverse quantization unit 42A and inverse transform unit 44A may apply inverse quantization and inverse transformation, respectively, to reconstruct the residual block. Summer 48B adds the reconstructed residual block to the prediction block produced by prediction unit 33A to produce a reconstructed video block for storage in frame stores 35A. The reconstructed video block stored in frame store 34 may be used by prediction unit 32 of base layer encoder 30 to intra- or inter-code a subsequent video block. Additionally, as will be described in more detail below, the reconstructed video block stored in frame store 35A may be used by prediction unit 33B of enhancement layer encoder 32 to intra- or inter-code refinements of the video block in the enhancement layer.

Following quantization, summer 48C subtracts from the quantized residual coefficients an intra-predicted block generated by intra prediction unit 40A. Intra-prediction unit 40A may generate the prediction block using intra-prediction based on one or more previously encoded blocks within the same frame as the block currently being coded. Base layer entropy encoder 46 entropy encodes the coefficients output from summer 48C, e.g., using CAVLC as defined in the H.264/MPEG-4, Part 10 AVC standard and described in detail above with respect to FIG. 2.

Enhancement layer encoder 32 includes a prediction unit 33B, frame store 35B, transform unit 38B, quantization unit 40B, coefficient scanning unit 41B, inverse quantization unit 42B, inverse transform unit 44B, an enhancement layer entropy encoder 49 and summers 48D-48F. The units of enhancement layer encoder 32 are substantially similar to those of like-numbered units of base layer encoder 30. As such, only the differences will be described.

Prediction unit 33B of enhancement layer encoder 32 generates a prediction block that is a predicted version of the current video block. Unlike prediction unit 33A of base layer encoder 30, which uses previously encoded blocks of the base layer to generate the prediction block, prediction unit 33B of enhancement layer encoder 32 may generate the prediction block based on one or more previously encoded blocks of the enhancement layer. The reconstructed video block of the enhancement layer may be at a second, higher quality level than the prediction block of the base layer.

An additional difference between enhancement layer encoder 32 and base layer encoder 30 is that the output of inverse quantization unit 42B of enhancement layer encoder 32 is combined with the output of inverse quantization unit 42A of enhancement layer encoder 30 at summer 48F. Adding the outputs of inverse quantization unit 42A and 42B generate a higher quality reconstructed video block, thus allowing for the better prediction by prediction unit described above.

The techniques described in this disclosure may be implemented in hardware, software, firmware, or any combination thereof. Any features described as units or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software units or hardware units configured for encoding and decoding, or incorporated in a combined video encoder-decoder (CODEC). Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various embodiments have been described. These and other embodiments are within the scope of the following claims.

The invention claimed is:

1. A method of encoding video data using scalable video coding, the method comprising:
   encoding, by a video coding apparatus, a video block at a first quality as part of a base layer bit stream;
   encoding, by the video coding apparatus, as part of at least one enhancement layer bit stream, refinements of the video block that when combined with the video block encoded at the first quality results in the video block having a second quality that is greater than the first quality, wherein the refinements of the video block are encoded without performing a first coding pass to gather statistics to use in video coding table selection,
   wherein the refinements are at least one of additional coefficients and refinements to existing coefficients, and
   wherein encoding the refinements comprises encoding, for each nonzero coefficient of the refinements of the video block, a symbol to indicate there is at least one remaining nonzero coefficient, a run length to indicate a number of zero valued coefficients preceding the nonzero coefficient, and a sign of the nonzero coefficient; and
   adjusting, with the video coding apparatus, magnitudes of the nonzero coefficients of the refinements of the video block to be equal to one.

2. The method of claim 1, wherein encoding the refinements of the video block comprises encoding each nonzero coefficient of the refinements without analyzing any subsequent coefficients.

3. The method of claim 1, further comprising encoding a symbol to indicate that there are no remaining nonzero coefficients in the refinements of the video block after encoding a last nonzero coefficient.

4. The method of claim 1, wherein adjusting the magnitude of each of the nonzero coefficients of the refinements of the video block to be equal to one comprises encoding the nonzero coefficients without encoding magnitudes of the coefficients.

5. The method of claim 1, wherein encoding the refinements of the video block as part of the enhancement layer bit stream comprises encoding the refinements of the video block such that coefficients of the refinements of the video block are decodable without accessing coefficient information of the video block encoded at the first quality as part of the base layer bit stream.

6. The method of claim 1, further comprising encoding the refinements of the video block using only a single variable length coding (VLC) table.

7. The method of claim 1, wherein encoding the video block at the first quality as part of the base layer comprises encoding the video block at the first quality using a coding technique that analyzes a coefficient vector of the video block in one coding pass and encodes the coefficient vector in another coding pass based on the analysis.

8. The method of claim 7, wherein:
   encoding the video block at the first quality comprises encoding the video block at the first quality using a context adaptive variable length coding (CAVLC) process in accordance with the ITU-T H.264/MPEG-4, Part 10, Advanced Video Coding (AVC) standard; and
   encoding the refinements of the video block comprises encoding the refinements of the video block using one of the VLC tables defined in the CAVLC process.

9. The method of claim 1, wherein the first and second qualities comprise one of a first and second signal-to-noise ratio (SNR) and a first and second spatial resolution.

10. A device for encoding video data using scalable video coding, the device comprising:
   a memory device storing a software program or executable instruction; and
   at least one encoder comprising one or more processors in communication with the memory device to execute the software program or executable instruction, the one or more processors configured to:
   encode a video block at a first quality as part of a base layer bit stream;
   encode, as part of at least one enhancement layer bit stream, refinements of the video block that when combined with the video block encoded at the first quality results in the video block having a second quality that is greater than the first quality, wherein the refinements of the video block are encoded without performing a first coding pass to gather statistics to use in video coding table selection, and wherein the refinements are at least one of additional coefficients and refinements to existing coefficients;
   encode, for each nonzero coefficient of the refinements of the video block, a symbol to indicate there is at least one remaining nonzero coefficient, a run length to indicate a number of zero valued coefficients preceding the nonzero coefficient, and a sign of the nonzero coefficient; and adjust magnitudes of the nonzero coefficients of the refinements of the video block to be equal to one.

11. The device of claim 10, wherein the at least one encoder encodes each nonzero coefficient of the refinements without analyzing any subsequent coefficients.

12. The device of claim 10, wherein the at least one encoder encodes a symbol to indicate that there are no remaining nonzero coefficients in the refinements of the video block after encoding a last nonzero coefficient.

13. The device of claim 10, wherein the at least one encoder encodes the nonzero coefficients without encoding magnitudes of the coefficients.

14. The device of claim 10, wherein the at least one encoder encodes the refinements of the video block such that coefficients of the refinements of the video block are decodable without accessing coefficient information of the video block encoded at the first quality as part of the base layer bit stream.

15. The device of claim 10, wherein the at least one encoder encodes the refinements of the video block using only a single variable length coding (VLC) table.

16. The device of claim 10, wherein the at least one encoder encodes the video block at the first quality using a coding technique that analyzes a coefficient vector of the video block in one coding pass and encodes the coefficient vector in another coding pass based on the analysis.

17. The device of claim 16, wherein the at least one encoder:
    encodes the video block at the first quality comprises encoding the video block at the first quality using a context adaptive variable length coding (CAVLC) process in accordance with the ITU-T H.264/MPEG-4, Part 10, Advanced Video Coding (AVC) standard; and
    encodes the refinements of the video block comprises encoding the refinements of the video block using one of the VLC tables defined in the CAVLC process.

18. The device of claim 10, wherein the first and second qualities comprise one of a first and second signal-to-noise ratio (SNR) and a first and second spatial resolution.

19. The device of claim 10, wherein the at least one encoder comprises:
    a base layer encoder that encodes the video block at the first quality as part of a base layer bit stream, and
    an enhancement layer encoder that encodes, as part of the at least one enhancement layer bit stream, refinements of the video block that when combined with the video block encoded at the first quality results in the video block having the second quality that is greater than the first quality.

20. The device of claim 10, wherein the device comprises a wireless communication device.

21. The device of claim 10, wherein the device comprises an integrated circuit device.

22. A non-transitory computer-readable medium comprising instructions to cause one or more processors to:
    encode a video block at a first quality as part of a base layer bit stream; and
    encode, as part of at least one enhancement layer bit stream, refinements of the video block that when combined with the video block encoded at the first quality results in the video block having a second quality that is greater than the first quality, wherein the refinements of the video block are encoded without performing a first coding pass to gather statistics to use in video coding table selection,
    wherein the refinements are at least one of additional coefficients and refinements to existing coefficients, and
    wherein the instructions that cause the one or more processors to encode the refinements comprise instructions that cause the one or more processors to encode, for each nonzero coefficient of the refinements of the video block, a symbol to indicate there is at least one remaining nonzero coefficient, a run length to indicate a number of zero valued coefficients preceding the nonzero coefficient, and a sign of the nonzero coefficient; and
    adjust magnitudes of the nonzero coefficients of the refinements of the video block to be equal to one.

23. The computer-readable medium of claim 22, wherein the instructions cause one or more processors to encode each nonzero coefficient of the refinements without analyzing any subsequent coefficients.

24. The computer-readable medium of claim 22, wherein the instructions cause one or more processors to encode a symbol to indicate that there are no remaining nonzero coefficients in the refinements of the video block after encoding a last nonzero coefficient.

25. The computer-readable medium of claim 22, wherein the instructions cause one or more processors to encode the nonzero coefficients without encoding magnitudes of the coefficients.

26. The computer-readable medium of claim 22, wherein the instructions cause one or more processors to encode the refinements of the video block such that coefficients of the refinements of the video block are decodable without accessing coefficient information of the video block encoded at the first quality as part of the base layer bit stream.

27. The computer-readable medium of claim 22, wherein the instructions cause one or more processors to encode the refinements of the video block using only a single variable length coding (VLC) table.

28. The computer-readable medium of claim 22, wherein the instructions cause one or more processors to encode the video block at the first quality using a coding technique that analyzes a coefficient vector of the video block in one coding pass and encodes the coefficient vector in another coding pass based on the analysis.

29. The computer-readable medium of claim 28, wherein the instructions cause one or more processors to:
    encode the video block at the first quality comprises encoding the video block at the first quality using a context adaptive variable length coding (CAVLC) process in accordance with the ITU-T H.264/MPEG-4, Part 10, Advanced Video Coding (AVC) standard; and
    encode the refinements of the video block comprises encoding the refinements of the video block using one of the VLC tables defined in the CAVLC process.

30. The computer-readable medium of claim 22, wherein the first and second qualities comprise one of a first and second signal-to-noise ratio (SNR) and a first and second spatial resolution.

31. A device for encoding video data using scalable video coding, the device comprising:
    a processor; and
    a memory storing computer executable instructions that when executed by the processor, cause the processor to implement:
    first means for encoding a video block at a first quality as part of a base layer bit stream; and
    second means for encoding, as part of at least one enhancement layer bit stream, refinements of the video block that when combined with the video block encoded at the first quality results in the video block having a second quality that is greater than the first quality, wherein the refinements of the video block are encoded without performing a first coding pass to gather statistics to use in video coding table selection, wherein the refinements are at least one of additional coefficients and refinements to existing coefficients, wherein the second means for encoding means encodes, for each nonzero coefficient of the refinements of the video block, a symbol to indicate there is at least one remaining nonzero coefficient, a run length to indicate the number of zero valued coefficients preceding the nonzero coefficient, and a sign of the nonzero coefficient, and wherein the second means for encoding means adjusts magnitudes of the nonzero coefficients of the refinements of the video block to be equal to one.

32. The device of claim 31, wherein the second means for encoding encodes each nonzero coefficient of the refinements without analyzing any subsequent coefficients.

33. The device of claim 32, wherein the second means for encoding encodes a symbol to indicate that there are no remaining nonzero coefficients in the refinements of the video block after encoding a last nonzero coefficient.

34. The device of claim 31, wherein the second means for encoding encodes the nonzero coefficients without encoding magnitudes of the coefficients.

35. The device of claim 31, wherein the second means for encoding encodes the refinements of the video block such that coefficients of the refinements of the video block are decodable without accessing coefficient information of the video block encoded at the first quality as part of the base layer bit stream.

36. The device of claim 31, wherein the second means for encoding encodes the refinements of the video block using only a single variable length coding (VLC) table.

37. The device of claim 31, wherein the first means for encoding the video block at the first quality as part of the base layer comprises means for encoding the video block at the first quality using a coding technique that analyzes a coefficient vector of the video block in one coding pass and encodes the coefficient vector in another coding pass based on the analysis.

38. The device of claim 37, wherein the first means for encoding:
encodes the video block at the first quality comprises encoding the video block at the first quality using a context adaptive variable length coding (CAVLC) process in accordance with the ITU-T H.264/MPEG-4, Part 10, Advanced Video Coding (AVC) standard; and
encodes the refinements of the video block comprises encoding the refinements of the video block using one of the VLC tables defined in the CAVLC process.

39. The device of claim 31, wherein the first and second qualities comprise one of a first and second signal-to-noise ratio (SNR) and a first and second spatial resolution.

40. A method for decoding video data using scalable video coding, the method comprising:
decoding, by a video coding apparatus, a base layer bit stream to obtain a video block at a first quality;
decoding, by the video coding apparatus, an enhancement layer bit stream to obtain refinements of the video block that, when combined with the video block decoded at the first quality, result in the video block having a second quality,
wherein the refinements are at least one of additional coefficients and refinements to existing coefficients, and
wherein decoding the enhancement layer includes decoding, for each nonzero coefficient of the refinements of the video block, a symbol indicating there is at least one remaining nonzero coefficient, a run length indicating a number of zero valued coefficients preceding the nonzero coefficient and a sign of the nonzero coefficient; and
setting, with the video coding apparatus, a magnitude of each nonzero coefficient equal to one.

41. The method of claim 40, further comprising decoding a symbol following a last nonzero coefficient that indicates that there are no remaining nonzero coefficients in the refinements of the video block.

42. The method of claim 41, further comprising generating a vector of coefficients for the refinements of the video block using the decoded run of each coefficient, the sign of each coefficient and the symbol indicating that there are no remaining nonzero coefficients.

43. The method of claim 40, wherein decoding the refinements of the video block comprises decoding the refinements of the video block without accessing coefficient information of the video block encoded at the first quality.

44. The method of claim 40, further comprising decoding the refinements of the video block using only a single variable length coding (VLC) table.

45. The method of claim 44, wherein the single VLC table comprises one of the VLC tables specified in CAVLC as defined in ITU-T H.264/MPEG-4, Part 10, Advanced Video Coding (AVC) standard.

46. A device for decoding video data using scalable video coding, the device comprising:
a memory device storing a software program or executable instruction; and
at least one decoder comprising one or more processors in communication with the memory device to execute the software program or executable instruction, the one or more processors configured to:
decode a base layer bit stream to obtain a video block at a first quality;
decode an enhancement layer bit stream to obtain refinements of the video block that, when combined with the video block decoded at the first quality, result in the video block having a second quality,
wherein the refinements are at least one of additional coefficients and refinements to existing coefficients, and
wherein the at least one decoder decodes for each nonzero coefficient of the refinements of the video block, a symbol indicating there is at least one remaining nonzero coefficient, a run length indicating a number of zero valued coefficients preceding the nonzero coefficient and a sign of the nonzero coefficient; and
set a magnitude of each nonzero coefficient equal to one.

47. The device of claim 46, wherein the at least one decoder decodes a symbol following a last nonzero coefficient that indicates that there are no remaining nonzero coefficients in the refinements of the video block.

48. The device of claim 47, wherein the at least one decoder generates a vector of coefficients for the refinements of the video block using the decoded run of each coefficient, the sign of each coefficient and the symbol indicating that there are no remaining nonzero coefficients.

49. The device of claim 46, wherein the at least one decoder decodes the refinements of the video block without accessing coefficient information of the video block encoded at the first quality.

50. The device of claim 46, wherein the at least one decoder decodes the refinements of the video block using only a single variable length coding (VLC) table.

51. The device of claim 50, wherein the single VLC table comprises one of the VLC tables specified in CAVLC as defined in ITU-T H.264/MPEG-4, Part 10, Advanced Video Coding (AVC) standard.

52. The device of claim 46, wherein the at least one decoder comprises:
 a base layer decoder that decodes the base layer bit stream to obtain the video block at the first quality; and
 an enhancement layer decoder that decodes the enhancement layer bit stream to obtain the refinements of the video block.

53. The device of claim 46, wherein the device comprises a wireless communication device.

54. The device of claim 46, wherein the device comprises an integrated circuit device.

55. A non-transitory computer-readable medium comprising instructions to cause one or more processors to:
 decode a base layer bit stream to obtain a video block at a first quality;
 decode an enhancement layer bit stream to obtain refinements of the video block that, when combined with the video block decoded at the first quality, result in the video block having a second quality,
 wherein the refinements are at least one of additional coefficients and refinements to existing coefficients, and
 wherein the instructions cause the one or more processors to decode for each nonzero coefficient of the refinements of the video block, a symbol indicating there is at least one remaining nonzero coefficient, a run length indicating a number of zero valued coefficients preceding the nonzero coefficient and a sign of the nonzero coefficient; and
 set a magnitude of each nonzero coefficient equal to one.

56. The computer-readable medium of claim 55, wherein the instructions cause one or more processors to decode a symbol following a last nonzero coefficient that indicates that there are no remaining nonzero coefficients in the refinements of the video block.

57. The computer-readable medium of claim 56, wherein the instructions cause one or more processors to generate a vector of coefficients for the refinements of the video block using the decoded run of each coefficient, the sign of each coefficient and the symbol indicating that there are no remaining nonzero coefficients.

58. The computer-readable medium of claim 55, wherein the instructions cause one or more processors to decode the refinements of the video block without accessing coefficient information of the video block encoded at the first quality.

59. The computer-readable medium of claim 55, wherein the instructions cause one or more processors to decode the refinements of the video block using only a single variable length coding (VLC) table.

60. The computer-readable medium of claim 59, wherein the single VLC table comprises one of the VLC tables specified in CAVLC as defined in ITU-T H.264/MPEG-4, Part 10, Advanced Video Coding (AVC) standard.

61. A device for decoding video data using scalable video coding, the device comprising:
 a processor; and
 a memory storing computer executable instructions that when executed by the processor, cause the processor to implement:
 first means for decoding a base layer bit stream to obtain a video block at a first quality; and
 second means for decoding an enhancement layer bit stream to obtain refinements of the video block that, when combined with the video block decoded at the first quality, result in the video block having a second quality,
 wherein the refinements are at least one of additional coefficients and refinements to existing coefficients, and
 wherein the second means for decoding means decodes, for each nonzero coefficient of the refinements of the video block, a symbol indicating there is at least one remaining nonzero coefficient, a run length indicating a number of zero valued coefficients preceding the nonzero coefficient and a sign of the nonzero coefficient; and
 means for setting a magnitude of each nonzero coefficient equal to one.

62. The device of claim 61, wherein the second means for decoding decodes a symbol following a last nonzero coefficient that indicates that there are no remaining nonzero coefficients in the refinements of the video block.

63. The device of claim 62, further comprising means for generating a vector of coefficients for the refinements of the video block using the decoded run of each coefficient, the sign of each coefficient and the symbol indicating that there are no remaining nonzero coefficients.

64. The device of claim 61, wherein the second means for decoding decodes the refinements of the video block without accessing coefficient information of the video block encoded at the first quality.

65. The device of claim 61, wherein the second means for decoding decodes the refinements of the video block using only a single variable length coding (VLC) table.

66. The device of claim 65, wherein the single VLC table comprises one of the VLC tables specified in CAVLC as defined in ITU-T H.264/MPEG-4, Part 10, Advanced Video Coding (AVC) standard.

\* \* \* \* \*